US012160814B2

(12) United States Patent
Kim et al.

(10) Patent No.: US 12,160,814 B2
(45) Date of Patent: Dec. 3, 2024

(54) METHOD FOR EDGE COMPUTING SERVICE AND ELECTRONIC DEVICE THEREFOR

(71) Applicant: Samsung Electronics Co., Ltd., Gyeonggi-do (KR)

(72) Inventors: Sunghoon Kim, Gyeonggi-do (KR); Jicheol Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 254 days.

(21) Appl. No.: 17/599,331

(22) PCT Filed: Mar. 27, 2020

(86) PCT No.: PCT/KR2020/004257
§ 371 (c)(1),
(2) Date: Sep. 28, 2021

(87) PCT Pub. No.: WO2020/204505
PCT Pub. Date: Oct. 8, 2020

(65) Prior Publication Data
US 2022/0201597 A1 Jun. 23, 2022

Related U.S. Application Data

(60) Provisional application No. 62/826,218, filed on Mar. 29, 2019.

(51) Int. Cl.
*H04W 48/16* (2009.01)
*H04W 12/06* (2021.01)
(Continued)

(52) U.S. Cl.
CPC ........... *H04W 48/16* (2013.01); *H04W 12/06* (2013.01); *H04W 48/18* (2013.01); *H04L 2101/365* (2022.05)

(58) Field of Classification Search
CPC ..... H04W 4/023; H04W 48/16; H04W 12/06; H04W 48/18; H04L 2101/365;
(Continued)

(56) References Cited

U.S. PATENT DOCUMENTS

2006/0121924 A1  6/2006 Rengaraju et al.
2011/0167270 A1  7/2011 Lee et al.
(Continued)

FOREIGN PATENT DOCUMENTS

CA   2 734 481    10/2011
CN   101341779    1/2009
(Continued)

OTHER PUBLICATIONS

European Search Report dated Mar. 20, 2023 issued in counterpart application No. 20784458.0-1213, 7 pages.
(Continued)

*Primary Examiner* — Vinncelas Louis
(74) *Attorney, Agent, or Firm* — The Farrell Law Firm, P.C.

(57) ABSTRACT

A method for authenticating an electronic device which receives an edge computing service from an authentication server of a mobile communication system, includes performing first authentication of the electronic device by an authentication and key agreement with the electronic device, when the first authentication is successful, providing first authentication information to the electronic device and performing second authentication for the edge computing service of the electronic device, and when the second authentication is successful, providing the electronic device with second authentication information which includes an access token for authentication of the edge computing service.

16 Claims, 18 Drawing Sheets

(51) Int. Cl.
*H04W 48/18* (2009.01)
*H04L 101/365* (2022.01)

(58) Field of Classification Search
CPC ....... H04L 61/58; H04L 61/59; H04L 9/0838; H04L 61/4511; H04L 67/14; H04L 2209/80; H04L 9/3213; H04L 67/12; H04L 67/141; H04L 67/289; H04L 67/51; H04L 67/568; H04L 2463/082; H04L 61/3025; H04L 63/083; H04L 63/0876; H04L 63/0884; H04L 63/168; H04L 43/062; G06F 16/9577
See application file for complete search history.

(56) References Cited

U.S. PATENT DOCUMENTS

| | | | |
|---|---|---|---|
| 2012/0039323 | A1 | 2/2012 | Hirano et al. |
| 2013/0065585 | A1* | 3/2013 | Pelletier ............ H04W 4/023 |
| | | | 455/456.6 |
| 2016/0157056 | A1 | 6/2016 | Kim et al. |
| 2017/0026233 | A1 | 1/2017 | Boutros et al. |
| 2017/0201585 | A1 | 7/2017 | Doraiswamy et al. |
| 2017/0251368 | A1 | 8/2017 | Ross et al. |
| 2017/0303259 | A1 | 10/2017 | Lee et al. |
| 2017/0339118 | A1 | 11/2017 | Hwang et al. |
| 2018/0192471 | A1 | 7/2018 | Li et al. |
| 2018/0249317 | A1 | 8/2018 | Kurasugi et al. |
| 2018/0288141 | A1 | 10/2018 | Mo et al. |
| 2019/0102351 | A1* | 4/2019 | Wu ..................... G06F 16/9577 |
| 2019/0141610 | A1* | 5/2019 | Sabella ............... G06F 9/45533 |
| 2019/0182788 | A1 | 6/2019 | Lee et al. |
| 2019/0313358 | A1 | 10/2019 | Lee et al. |
| 2020/0100205 | A1* | 3/2020 | Dodd-Noble ......... H04L 43/062 |

FOREIGN PATENT DOCUMENTS

| | | |
|---|---|---|
| JP | 2009-145989 | 7/2009 |
| JP | 2012-524424 | 10/2012 |
| JP | 2013-115680 | 6/2013 |
| JP | 2016-523044 | 8/2016 |
| JP | 2016-208548 | 12/2016 |
| JP | 2019-536305 | 12/2019 |
| KR | 10-2004-0013966 | 2/2004 |
| KR | 10-2007-0052492 | 5/2007 |
| KR | 10-2009-0039451 | 4/2009 |
| KR | 10-2017-0119296 | 10/2017 |
| KR | 10-2017-0129549 | 11/2017 |
| KR | 10-2018-0021636 | 3/2018 |
| KR | 10-2018-0119162 | 11/2018 |
| KR | 10-2020-0130365 | 11/2020 |
| WO | WO 2011/081242 | 7/2011 |
| WO | WO 2017/167050 | 10/2017 |
| WO | WO 2018/038490 | 3/2018 |

OTHER PUBLICATIONS

ETSI, Multi-Access Edge Computing (MEC); UE Application Interface, Draft ETSI GS MEC 016 V2.0.7, Mar. 2019, 22 pages.
European Search Report dated Mar. 9, 2022 issued in counterpart application No. 20784458.0-1213, 10 pages.
PCT/ISA/210 Search Report issued on PCT/KR2020/004257, Jul. 30, 2020, pp. 7.
PCT/ISA/237 Written Opinion issued on PCT/KR2020/004257, Jul. 30, 2020, pp. 5.
Reinke, Johann, "Bubble Code", http://www.bubblecode.net/en/2016/01/22/understanding-oauth2/, Jan. 22, 2016, pp. 22.
3GPP TSG SA WG6#30, S6-190533, Apr. 8-12, 2019, Newport Beach, California, USA, pp. 36.
3GPP; TSG SA; System Architecture for the 5G System; Stage 2 (Release 16), 3GPP TS 23.501 V16.0.0, Mar. 28, 2019, pp. 320.
PCT/ISA/210 Search Report issued on PCT/KR2020/004167, Jul. 2, 2020, pp. 5.
PCT/ISA/237 Written Opinion issued on PCT/KR2020/004167, Jul. 2, 2020, pp. 5.
Japanese Office Action dated Oct. 10, 2023 issued in counterpart application No. 2021-558600, 16 pages.
Chinese Office Action dated Dec. 6, 2023 issued in counterpart application No. 202080036547.0, 14 pages.
Indian Examination Report dated Oct. 11, 2023 issued in counterpart application No. 202117044076, 7 pages.
Japanese Office Action dated Apr. 8, 2024 issued in counterpart application No. 2021-558600, 8 pages.
European Search Report dated Feb. 14, 2024 issued in counterpart application No. 20784458.0-1213, 8 pages.
Chinese Office Action dated May 14, 2024 issued in counterpart application No. 202080036547.0, 17 pages.
ETSI, Mobile Edge Computing (MEC); Ue Application Interface, ETSI GS MEC 016 V1.1.1, Sep. 2017, 21 pages.
Japanese Notice of Allowance dated Oct. 15, 2024 issued in counterpart application No. 2021-558600, 7 pages.

\* cited by examiner

METHOD FOR EDGE COMPUTING SERVICE AND ELECTRONIC DEVICE THEREFOR

PRIORITY

This application is a National Phase Entry of PCT International Application No. PCT/KR2020/004257, which was filed on Mar. 27, 2020, and claims priority to U.S. Provisional Patent Application No. 62/826,218, which was filed on Mar. 29, 2019, the content of each of which is incorporated herein by reference.

TECHNICAL FIELD

Embodiments of the disclosure relate to a method of supporting an edge computing service (for example, a Multi-access Edge Computing (MEC) service) and an electronic device therefor.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in ultra-high frequency (mmWave) bands (e.g., 60 GHz bands), so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

According to such a technical trend, a technology using a channel bonding scheme for high speed transmission of data in a WiFi wireless communication system which is one of various wireless communication systems has appeared. In the WiFi wireless communication system, the scheme using the channel bonding technology bonds an additional band to a basic band to increase a data transmission rate. The standard regulation of the technologies, for example, the IEEE 802.11ac standard may bond eight 20 MHz channels to support a maximum of a 160 MHz band, and the channel bonding technology is going to be applied to the IEEE 802.11ay standard. When the channel bonding technology is used, an increase in power consumption of an electronic device is inevitable.

An edger computing technology for transmitting data through an edge server is recently discussed. The edge computing technology may include, for example, Multi-access Edge Computing (MEC) or fog computing. The edge computing technology may be a technology that provides data to an electronic device through a separate server (hereinafter, referred to as an edge server or an MEC server) installed at a location geographically close to the electronic device, for example, within a base station or near a base station. For example, an application requiring low latency among at least one application installed in the electronic device may transmit and receive data through an edge server installed at a geographically close location without passing through a server located in an external Data Network (DN) (for example, Internet).

Recently, a service (hereinafter, referred to as an "MEC-based service" or an "MEC service") using the edge computing technology is discussed, and an electronic device is researched and developed to support the MEC-based service. For example, an application of a mobile communication electronic device may transmit and receive edge computing-based data to and from an edge server (or an application of the edge server) on an application layer.

DISCLOSURE OF INVENTION

Technical Problem

In an MEC-based service, a safe service should be provided to execute a service between, for example, an electronic device (or user), a network, an operator, or an application provider. For example, for the MEC service, an edge server (or MEC application(s)) is required to provide a service (or access) to an authenticated and authorized (permitted) electronic device (or client application). For example, the application of the electronic device may communicate with an application of an edge server, and the edge server may authenticate the application of the electronic device and give an authorization according to an authentication result. For example, in the MEC-based service, applications authorized between the electronic device and the edge server may communicate with each other. For example, the electronic device and the edge server may perform a discovery (for example, MEC discovery) procedure (or an MEC service discovery procedure) when the authentication therebetween is completed.

Meanwhile, when a plurality of applications are installed in the electronic device, the respective applications may individually communicate with the edge server on an application layer in order to perform edge computing-based data transmission. For example, in the prior art, applications in the electronic device may individually perform an authentication, an authorization, and a discovery procedure to use the MEC service.

Various embodiments disclose a method and an apparatus capable of providing a service by executing an MEC application on the basis of an MEC host more optimized for the electronic device.

Various embodiments disclose a method and an apparatus capable of providing a service by executing an MEC application on the basis of an MEC host more optimized for an electronic device.

Various embodiments disclose a method and an apparatus for performing a discovery operation by an electronic device (for example, an MEC service module) rather than an individual application.

Various embodiments disclose a method and an apparatus capable of more rapidly and efficiently performing discovery and selecting an MEC host which can receive the best quality by allowing an electronic device (for example, MEC service module) rather than an individual application to perform MEC discovery.

Various embodiments disclose a method and an apparatus capable of providing a stable edge computing service by managing states of applications and a state of the electronic device together through an MEC service module installed in the electronic device.

Solution to Problem

A method according to an embodiment of the disclosure is a method of authenticating an electronic device receiving an edge computing service from an authentication server of a mobile communication system and includes performing a first authentication (403) of the electronic device in an Authentication and Key Agreement (AKA) scheme with the electronic device and providing first authentication information to the electronic device when the first authentication is successful; and performing a second authentication (411) for an edge computing service of the electronic device and providing second authentication information including an access token for an authentication of the edge computing service to the electronic device.

The method according to another embodiment of the disclosure is a method of an authentication for an edge computing service in a mobile communication system in which an electronic device of the mobile communication system provides the edge computing service and includes performing a first authentication (403) of the electronic device in an Authentication and Key Agreement (AKA) scheme with an authentication server of the mobile communication system and receiving first authentication information by the electronic device; and performing a second authentication (411) for the edge computing service with the authentication server and receiving second authentication information including an access token for an authentication of the edge computing service by the electronic device.

The method according to another embodiment of the disclosure is a method of providing edge computing service information to an electronic device receiving an edge computing service by a multi-access edge computing management proxy (MMP) server of a mobile communication system and includes receiving a query message of at least one edge computing server including a Fully Qualified Domain Name (FQDN) for the MMP from the electronic device; and transmitting a response message for responding to the query to the electronic device, wherein the response message includes an application list for providing the edge computing service through the MMP.

The method according to another embodiment of the disclosure is a method of acquiring edge computing service information by an electronic device in a mobile communication system for providing an edge computing service through a multi-access edge computing management proxy (MMP) server and includes transmitting a query message of at least one edge computing server including a Fully Qualified Domain Name (FQDN) for the MMP to the MMP; and receiving a response message for responding to the query from the MMP, wherein the response message includes an application list for providing the edge computing service through the MMP.

An electronic device according to an embodiment of the disclosure includes a network interface; at least one application for an edge computing service (multi-access edge computing services (MEC); a multi-access service agent (MSA) configured to perform an authentication of the electronic device, an authentication of the MEC, a policy of the MEC, and control according to a configuration of a data path of the MEC through the network interface; and a multi-access service enabler (MSE) configured to set a session with an MEC management proxy server (MMP) of a mobile communication system through the network interface, configure a path in data transmission, transmit query information, receive a response signal, and perform a discovery of an MEC application server through the MMP.

Advantageous Effects of Invention

An electronic device and a method of operating the same according to various embodiments can provide a service by executing an MEC application on the basis of a more optimal MEC host for an electronic device. According to various embodiments, a service discovery operation can be performed by an electronic device (for example, a service enabler) rather than by an individual application. According to various embodiments, since the MEC discovery is performed by the electronic device (for example, service enabler) rather than by the individual application, the discovery can be more rapidly and efficiently performed, and an MEC host capable of receiving the best quality can be selected. According to various embodiments, it is possible to provide a stable edge computing service by managing states of the applications and a state of the electronic device together through an MEC service module installed in the electronic device.

Further, various effects directly or indirectly detected through the disclosure can be provided.

BEST MODE FOR CARRYING OUT THE INVENTION

Figure 1:
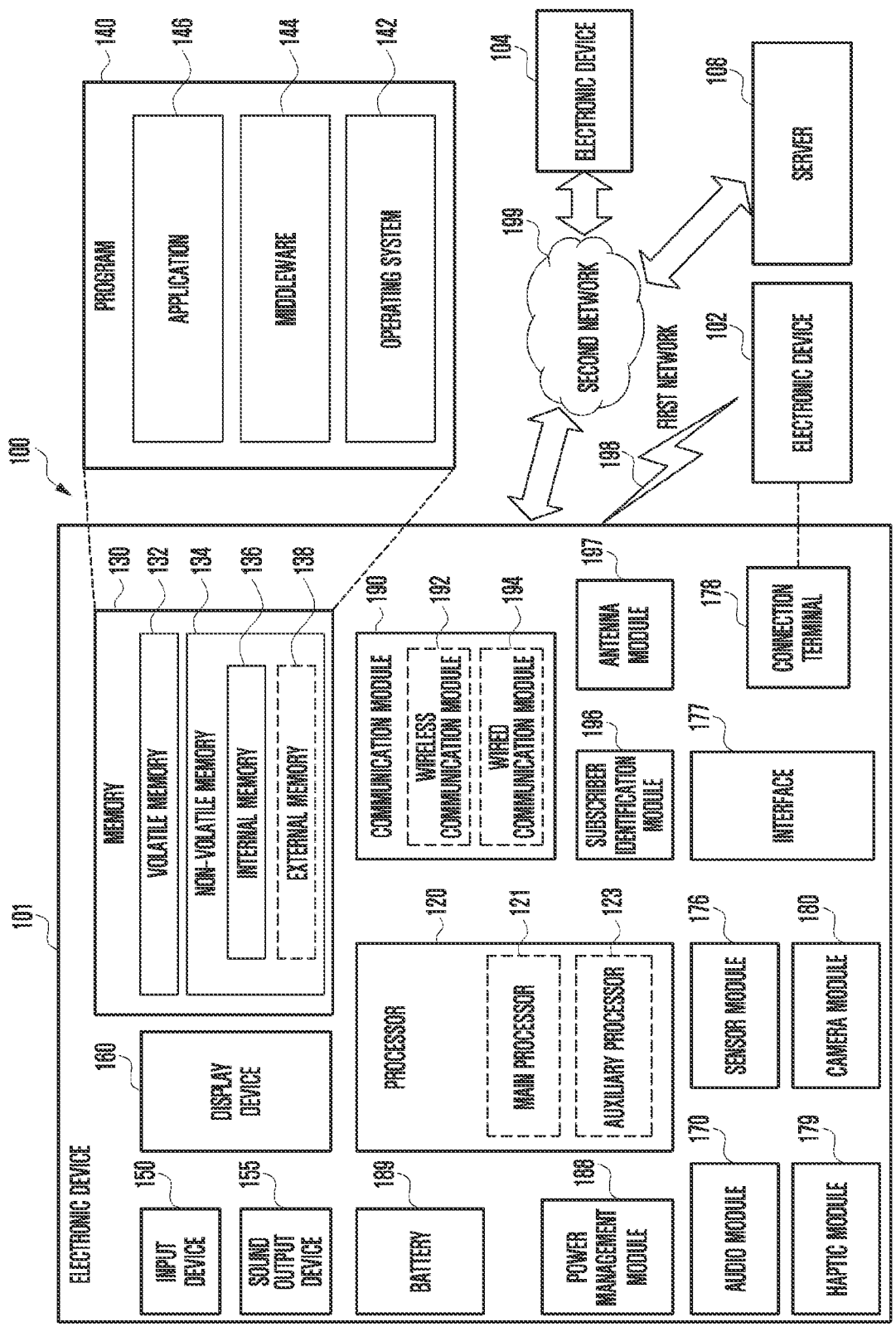
FIG. 1 is a block diagram illustrating an electronic device 101 within a network environment 100 according to various embodiments.

FIG. 1 is a block diagram illustrating an electronic device 101 within a network environment 100 according to various embodiments.

Referring to FIG. 1, the electronic device 101 may communicate with an electronic device 102 through a first network 198 (for example, a short-range wireless communication network) or with an electronic device 104 or a server 108 through a second network 199 (for example, a long-range wireless communication network) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In some embodiments, at least one of the elements (for example, the display device 160 or the camera module 180) may be omitted or one or more elements may be added to the electronic device 101. In some embodiments, some of the elements may be implemented as one integrated circuit. For example, the sensor module 176 (for example, a fingerprint sensor, an iris sensor, or an illumination sensor) may be implemented while being embedded into the display device 160 (for example, a display).

The processor 120 may control at least one other element (for example, hardware or software component) connected to the processor 120 by executing, for example, software (for example, the program 140) and perform various data processing or calculations. According to an embodiment, as at least the part of data processing or calculations, the processor 120 may load commands or data received from another element (for example, the sensor module 176, or the communication module 190) to the volatile memory 132, process the commands or data stored in the nonvolatile memory 132, and store resultant data in a non-volatile memory 134. According to an embodiment, the processor 120 may include a main processor 121 (for example, a Central Processing Unit (CPU) or an Application Processor (AP)) and an auxiliary processor 123 (for example, a Graphic Processing Unit (GPU), an Image Signal Processor (ISP), a sensor hub processor, or a Communication Processor (CP)) which can operate independently from the main processor or together therewith. Additionally or alternatively, the auxiliary processor 123 may use lower power than the main processor 121 or may be configured to be specialized for a predetermined function. The auxiliary processor 123 may be implemented separately from or as a portion of the main processor 121.

The auxiliary processor 123 may control at least some of functions or states related to at least one of the elements of the electronic device 101 (for example, the display device 160, the sensor module 176, or the communication module 190) on behalf of the main processor 121 while the main processor 121 is in an inactive (for example, sleep) state or together with the main processor 121 while the main processor 121 is in active (for example, application execution) state. According to an embodiment, the auxiliary processor 123 (for example, an image signal processor or a communication processor) may be implemented as a part of another element (for example, the camera module 180 or the communication module 190) functionally associated therewith.

The memory 130 may store various pieces of data used by at least one element (for example, the processor 120 or the sensor module 176) of the electronic device 101. The data may include software (for example, the program 140) and input data or output data on a command related thereto. The memory 130 may include a volatile memory 132 or a non-volatile memory 134.

The program 140 may be stored in the memory 130 as software, and may include, for example, an Operating System (OS) 142, middleware 144, or an application 146.

The input device 150 may receive a command or data to be used by an element of the electronic device 101 (for example, the processor 120) from the outside of the electronic device 101 (for example, the user). The input device 150 may include, for example, a microphone, a mouse, a keyboard, or a digital pen (for example, a stylus pen).

The sound output device 155 may output a sound signal to the outside of the electronic device 101. The sound output device 155 may include, for example, a speaker or a receiver. The speaker may be used for general purposes, such as reproducing multimedia or recording reproduction, and the receiver may be used for receiving an incoming call. According to an embodiment, the receiver may be implemented separately from the speaker or as a part thereof.

The display device 160 may visually provide information to the outside of the electronic device 101 (for example, the user). The display device 160 may include, for example, a display, a hologram device, a projector, and a control circuit for controlling a corresponding device. According to an embodiment, the display device 160 may include a touch circuit (circuitry) configured to detect a touch or a sensor circuit (for example, a pressure sensor) configured to measure the intensity of force generated by the touch.

The audio module 170 may convert a sound into an electric signal or, conversely, convert an electric signal into a sound. According to an embodiment, the audio module 170 may acquire a sound through the input device 150 or output a sound through the sound output device 155 or an external electronic device (for example, the electronic device 102) (for example, a speaker or headphones) directly or wirelessly connected to the electronic device 101.

The sensor module 176 may detect an operation state (for example, power or temperature) or an external environment state (for example, user state) and generate an electric signal or a data value corresponding to the detected state. According to an embodiment, the sensor module 176 may include, for example, a gesture sensor, a gyro sensor, a barometer sensor, a magnetic sensor, an acceleration sensor, a grip sensor, a proximity sensor, a color sensor (for example, RGB (red, green, blue) sensor), an Infrared sensor (IR) sensor, a biometric sensor, a temperature sensor, a humidity sensor, or an illuminance sensor.

The interface 177 may support one or more predetermined protocols which can be used to be directly or wirelessly connected to an external electronic device (for example, the electronic device 102) of the electronic device 101. According to an embodiment, the interface 177 may include, for example, a High-Definition Multimedia Interface (HDMI), a Universal Serial Bus (USB) interface, a Secure Digital (SD) card interface, or an audio interface.

A connection terminal 178 may include a connector through which the electronic device 101 can be physically connected to the external electronic device (for example, the electronic device 102). According to an embodiment, the connection terminal 178 may include, for example, an HDMI connector, a USB connector, an SD card connector, or an audio connector (for example, a headphone connector).

The haptic module 179 may convert an electric signal into mechanical stimulation (for example, vibration or motion) or electrical stimulation that the user can recognize through the sense of touch or the sense of movement. According to an embodiment, the haptic module 179 may include, for example, a motor, a piezoelectric element, or an electrical simulation device.

The camera module 180 may capture a still image and a moving image. According to an embodiment, the camera module 180 may include one or more lenses, image sensors, image signal processors, or flashes.

The power management module 188 may mange the power supplied to the electronic device 101. According to an embodiment, the power management module 188 may be implemented as, for example, at least a part of a Power Management Integrated Circuit (PMIC).

The battery 189 may supply power to at least one element of the electronic device 101. According to an embodiment, the battery 189 may include, for example, a non-rechargeable primary cell, a rechargeable secondary cell, or a fuel cell.

The communication module 190 may support establishment of a direct (for example, wired) communication channel or a wireless communication channel between the electronic device 101 and the external electronic device (for example, the electronic device 102, the electronic device 104, or the server 108) and communication through the established communication channel. The communication module 190 may include one or more communication processors which operates independently from the processor 120 (for example, an application processor) and supports direct (for example, wired) communication or wireless communication. According to an embodiment, the communication module 190 may include a wireless communication module 192 (for example, a cellular communication module, a short-range wireless communication module, or a Global Navigation Satellite System (GNSS) communication module) or a wired communication module 194 (for example, a Local Area Network (LAN) communication module or a power line communication module). Among the communication modules, the corresponding communication module may communicate with the external electronic device through the first network 198 (for example, a short-range communication network such as Bluetooth, Wi-Fi direct or Infrared Data Association (IrDA)) or the second network 199 (for example, a long-range communication network such as a cellular network, Internet, or a computer network (for example, a LAN or WAN)). Such various types of communication modules may be integrated into one element (for example, a single chip) or may be implemented as a plurality of separate elements (for example, a plurality of chips).

The wireless communication module 192 may identify and authenticate the electronic device 101 within a communication network such as the first network 198 or the second network 199 through subscriber information (for example, an International Mobile Subscriber Identification (IMSI)) stored in the subscriber identification module 196.

The antenna module 197 may transmit a signal or power to the outside (for example, the external electronic device) or receive the same from the outside. According to an embodiment, the antenna module 197 may include one antenna including a conductor configured on a substrate (for example, a PCB) or a radiator configured in a conductive pattern. According to an embodiment, the antenna module 197 may include a plurality of antennas. In this case, at least antenna suitable for a communication scheme used by the communication network such as the first network 198 or the second network 199 may be selected from among the plurality of antennas by, for example, the communication module 190. The signal or power may be transmitted or received between the communication module 190 and the external electronic device through at least one selected antenna. According to some embodiments, another component (for example, RFIC) as well as a radiator may be additionally implemented as a part of the antenna module 197.

At least some of the elements may be connected to each other through a scheme for communication between peripheral devices (for example, a bus, General Purpose Input/Output (GPIO), a Serial Peripheral Interface (SPI), or a Mobile Industry Processor Interface (MIPI)) and may exchange signals (for example, commands or data) therebetween.

According to an embodiment, the commands or data may be transmitted or received between the electronic device 101 and the external electronic device 104 through the server 108 connected to the second network 199. Each of the electronic devices 102 and 104 may be a device which is the same type as or a different type from that of the electronic device 101.

According to an embodiment, all or some of the operations performed by the electronic device 101 may be performed by one or more of the external electronic devices 102, 104, or 108. For example, when the electronic device 101 is required to perform a function or a service automatically or in response to a request from the user or another device, the electronic device 101 may make a request for performing at least some of the function or the service to one or more external electronic devices 102 and 104 instead of execution of the function or the service by itself or in additional to the execution thereof. The one or more external electronic devices 102 and 104 receiving the request may perform at least some of the requested function or service or the additional function or service related to the request, and transfer a result of the execution to the electronic device 101. The electronic device 101 may provide the result or additionally process the result and provide the processed result as at least a portion of a response to the request. To achieve this, for example, cloud computing, distributed computing, or client-server computing technology may be used.

The electronic device 101 according to various embodiments disclosed herein may be one of various types of electronic devices. The electronic devices 101 may include, for example, a portable communication device (e.g., a smart phone), a computer device, a portable multimedia device, a portable medical device, a camera, a wearable device, or a home appliance. The electronic device 101 according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Prior to description of various embodiments of the disclosure, the electronic device 101 to which an embodiment of the disclosure can be applied is described.

Figure 2:
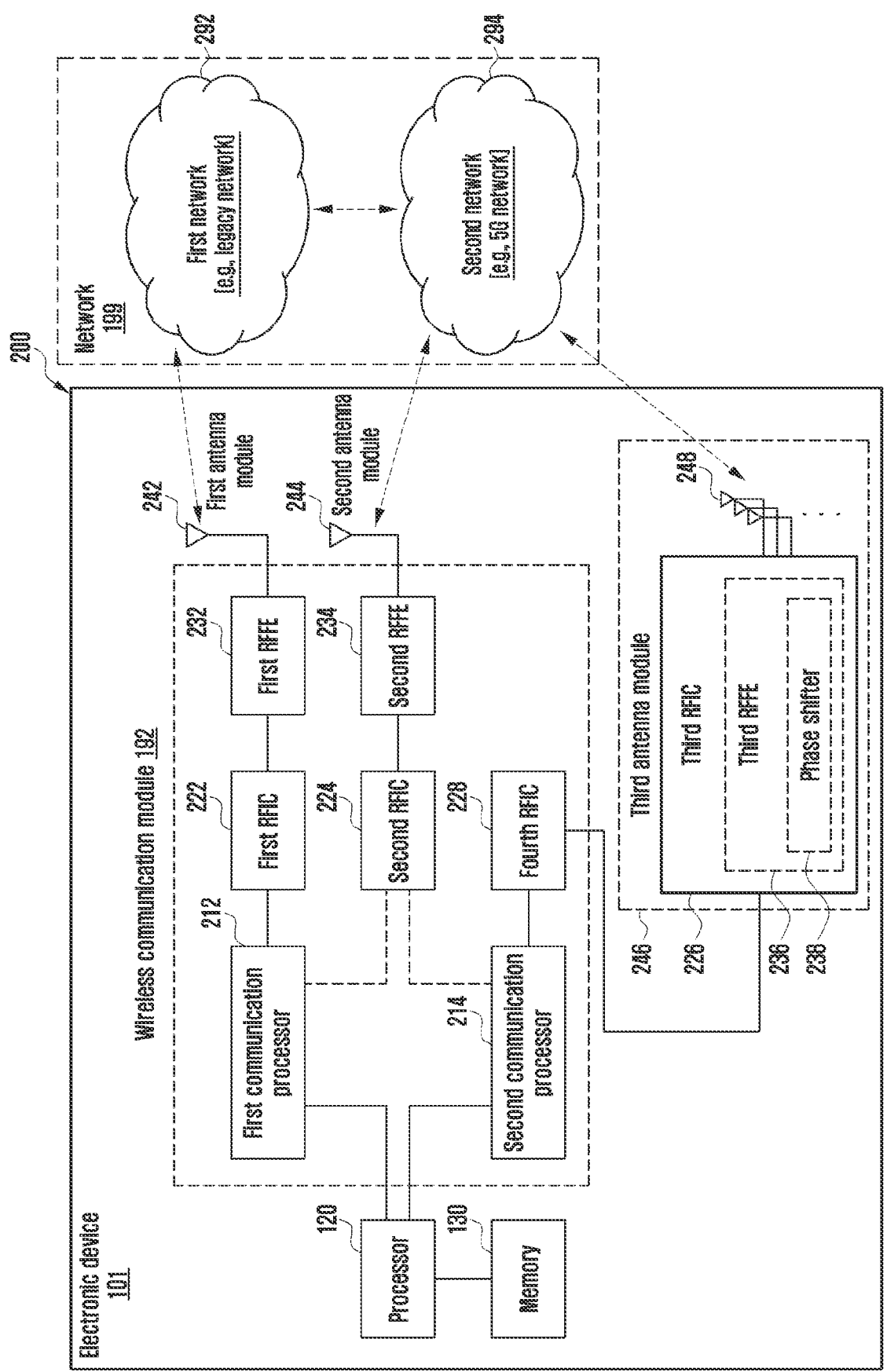
FIG. 2 is a block diagram 200 illustrating the electronic device 101 for supporting legacy network communication and 5G network communication according to various embodiments.

FIG. 2 is a block diagram 200 illustrating the electronic device 101 for supporting legacy network communication and 5G network communication according to various embodiments.

Referring to FIG. 2, the electronic device 101 may include a first communication processor 212, a second communication processor 214, a first RFIC 222, a second RFIC 224, a third RFIC 226, a fourth RFIC 228, a first Radio Frequency Front End (RFFE) 232, a second RFFE 234, a first antenna module 242, a second antenna module 244, and an antenna 248. The electronic device 101 may further include the processor 120 and the memory 130.

The network 199 may include the first network 292 and the second network 294. According to another embodiment, the electronic device 101 may further include at least one element among the elements illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to another embodiment, the fourth RFIC 228 may be omitted or may be included as a part of the third RFIC 226.

The first communication processor 212 may support establishment of a communication channel in a band to be used for wireless communication with the first network 292 and legacy network communication through the established communication channel. According to various embodiments, the first network 292 may be a legacy network including a $2^{th}$-generation (2G), 3G, 4G, or Long Term Evolution (LTE) network.

The second communication processor 214 may support establishment of a communication channel corresponding to a predetermined band (for example, about 6 GHz to about 60 GHz) among bands to be used for wireless communication with the second network 294 and 5G network communication through the established communication channel. According to various embodiments, the second network 294 may be a 5G network defined in the 3GPP.

In addition, according to an embodiment, the first communication processor 212 or the second communication processor 214 may support establishment of a communication channel corresponding to another predetermined band (for example, equal to or lower than about 6 GHz) among bands to be used for wireless communication with the second network 294 and 5G network communication through the established communication channel. According to an embodiment, the first communication processor 212 and the second communication processor 214 may be implemented within a single chip or a single package. According to various embodiments, the first communication processor 212 or the second communication processor 214 may be implemented within a single chip or a single package along with the processor 120, the auxiliary processor 123, or the communication module 190.

In transmission, the first RFIC 222 may convert a baseband signal generated by the first communication processor 212 into a Radio Frequency (RF) signal from about 700 MHz to about 3 GHz used by the first network 292 (for example, legacy network). In reception, the RF signal may be acquired from the first network 292 (for example, legacy network) through an antenna (for example, the first antenna module 242) and may be preprocessed through the RFFE (for example, first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, referred to as a 5G Sub6 RF signal) in a Sub6 band (for example, equal to or lower than about 6 GHz) used by the second network 294 (for example, 5G network). In reception, a 5G Sub6 RF signal may be acquired from the second network 294 (for example, 5G network) through an antenna (for example, the second antenna module 244) and may be preprocessed through the RFFE (for example, second RFFE 234). The second RFIC 224 may convert the preprocessed 5G Sub6 RF signal into a baseband signal to be processed by the corresponding communication processor among the first communication processor 212 or the second communication processor 214.

The third RFIC 226 may convert a baseband signal generated by the second communication processor 214 into an RF signal (hereinafter, referred to as a 5G Above6 RF signal) in a 5G Above6 band (for example, from about 6 GHz to about 60 GHz) used by the second network 294 (for example, 5G network). In reception, a 5G Above6 RF signal may be acquired from the second network 294 (for example, 5G network) through an antenna (for example, the antenna 248) and may be preprocessed through the third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

According to an embodiment, the electronic device 101 may include the fourth RFIC 228 separately from the third RFIC 226 or as a part thereof. In this case, the fourth RFIC 228 may convert the baseband signal generated by the second communication processor 214 into an RF signal (hereinafter, referred to as an IF signal) in an intermediate frequency band (for example, about 9 GHz to about 11 GHz) and then transfer the IF signal to the third RFIC 226. The third RFIC 226 may convert the IF signal into a 5G Above6 RF signal. In reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one of the first antenna module 242 or the second antenna module 244 may be omitted or combined with another antenna module to process RF signals in a plurality of corresponding bands.

According to an embodiment, the third RFIC 226 and the antenna 248 may be disposed on the same substrate to configure a third antenna module 246. For example, the wireless communication module 192 or the processor 120 may be disposed on a first substrate (for example, main PCB). In this case, the third RFIC 226 may be disposed in a partial area (for example, bottom side) of a second substrate (for example, sub PCB) separated from the first substrate and the antenna 248 may be disposed in another partial area (for example, top side) to configure the third antenna module 246. By disposing the third RFIC 226 and the antenna 248 on the same substrate, it is possible to reduce the length of a transmission line therebetween. This can reduce loss (for example, attenuation) of a signal in a high frequency band (for example, about 6 GHz to about 60 GHz) used by 5G network communication due to the transmission line. Accordingly, the electronic device 101 may improve a quality or a speed of communication with the second network 294 (for example, 5G network).

According to an embodiment, the antenna 248 may be configured as an antenna array including a plurality of antenna elements which can be used for beamforming. In this case, the third RFIC 226 may include, for example, a plurality of phase shifters 238 corresponding to the plurality of antenna elements as a part of the third RFFE 236. In transmission, each of the plurality of phase shifters 238 may convert a phase of a 5G Above6 RF signal to be transmitted to the outside of the electronic device (for example, a base station of the 5G network) through a corresponding antenna element. In reception, each of the plurality of phase shifters 238 may convert the phase of the 5G Above6 RF signal received from the outside through the corresponding antenna element into the same phase or substantially the same phase. This enables transmission or reception between the electronic device 101 and the outside through beamforming.

The second network 294 (for example, 5G network) may operate independently from the first network 292 (for example, legacy network) (for example, Stand-Alone (SA)) or operate through a connection to the first network 292 (for example, Non-Stand Alone (NSA)). For example, in the 5G network, only an access network (for example, a 5G Radio Access Network (RAN) or a Next Generation RAN (NG RAN)) may exist without a core network (for example, a Next Generation Core (NGC)). In this case, the electronic device 101 may access the access network of the 5G network and then access an external network (for example, Internet) under the control of the core network (for example, Evolved Packed Core (EPC)) of the legacy network. Protocol information (for example, LTE protocol information) for communication with the legacy network or protocol information (for example, New Radio (NR) protocol information) for communication with the 5G network may be stored in the memory 230 and may be accessed by another element (for example, the processor 120, the first communication processor 212, or the second communication processor 214).

Hereinafter, the 5G network technology described in the drawings and the description may refer to the standard regulation (for example, Technical Specification (TS) 23.501) defined by the International Telecommunication Unit (ITU) or the 3GPP, and the MEC technology may refer to the standard regulation (for example, MEC 001 to MEC 016) defined by the European Telecommunication Standards Institute (ETSI). Hereinafter, the description is made on the basis of the MEC technology, but the same or a similar principle may be applied to a fog computing technology defined in by openfog consortium.

Figure 3:
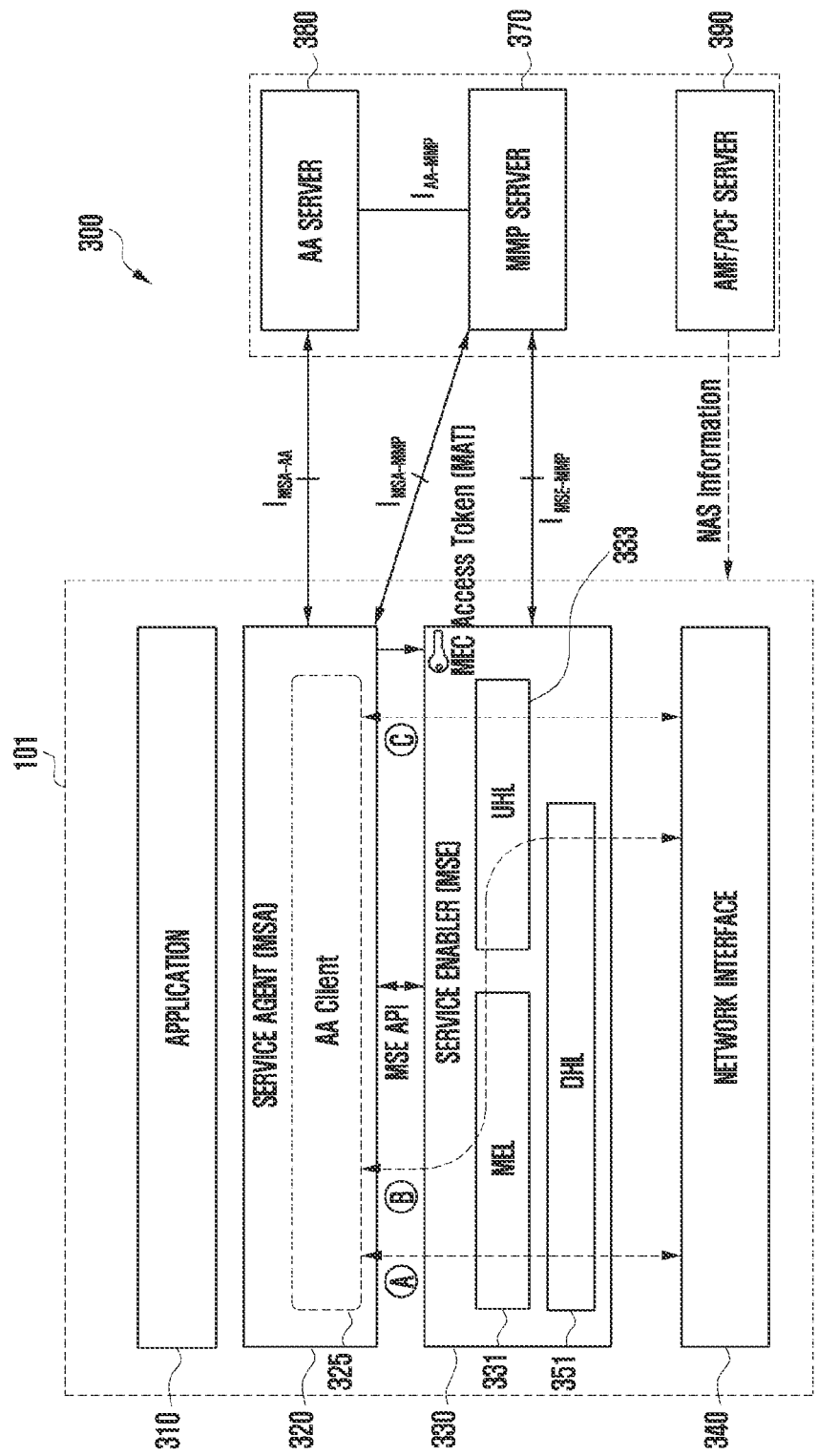
FIG. 3 illustrates the electronic device 101 and an external ser'er 300 for supporting an MEC-based service in a network environment according to various embodiments of the disclosure.

FIG. 3 illustrates the electronic device 101 and an external server 300 for supporting an MEC-based service in a network environment according to various embodiments of the disclosure.

As illustrated in FIG. 3, the electronic device 101 of FIG. 3 may show an example of software architecture for an MEC Authentication/Authorization (AA) procedure and an MEC discovery procedure.

According to an embodiment, the electronic device 101 may include application(s) 310 (hereinafter, referred to as client applications (Apps)) for an edge computing service (multi-access edge computing services) (hereinafter, referred to as an MEC service), a service agent 320 (for example, MSA) (hereinafter, referred to as an MSA 320), and a service enabler 330 (for example, MSE) (hereinafter, referred to as an MSE 330). According to an embodiment, the electronic device 101 may include a network interface 340 (for example, the wireless communication module 192 of FIG. 1 or FIG. 2) for establishment of a Protocol Data Unit (PDU) session related to data transmission, and also include a network driver (for example, a software driver) for controlling driving of the network interface 340 which is not illustrated. According to an embodiment, the client application 310, the MSA 320, and the MSE 330 may be configured to be installed in the electronic device 101 as software or to have a physical configuration. According to an embodiment, the MSA 320 and the MSE 330 may be driven as a part of the processor (for example, the processor 120 of FIG. 1). According to an embodiment, the MSA 320 and the MSE 330 may be separate hardware components independently operating from the processor 120. According to another embodiment, the MSA 320 and the MSE 340 may be software (for example, the program 140 of FIG. 1). For example, the MSA 320 and the MSE 340 in the software form may be stored in a memory (for example, the memory 130 of FIG. 1 or 2) in the form of commands (or instructions), and operations of the MSA 320 and the MSE 330 may be executed by the processor 120.

According to an embodiment, the client application 310 may include a $3^{rd}$ party application installed in the electronic device 101 by the user. According to an embodiment, the client application 310 may be an application using an MEC service such as MEC or fog computing. According to an embodiment, the client application 310 may include an application using a differentiated service such as a no charge (for example, Free of Charge (FOC)) service.

According to an embodiment, the client application 310 for MEC may be an application of the electronic device 101 accessing an MEC application executed by an MEC host. According to an embodiment, the MEC application may be an application installed in and executed by an MEC host adjacent to the user to communicate with the client application 310. According to an embodiment, the client application 310 may be authenticated through the MSA 320 (for example, service agent) serving as a separate authentication client. According to an embodiment, the client application 310 may access the network on the basis of a specific PDU session (for example, an MEC-dedicated PDU session) through the network interface 340 or access the MEC application on the basis of the existing PDU session (for example, default PDU session) through a DNS proxy function of the MSE 330 (for example, service enabler).

According to an embodiment, the client application 310 for the FOC service may be an application of the electronic device 101 to which a data FOC policy is applied. According to an embodiment, when the client application 310 is authenticated through the MSA 320 serving to perform FOC authentication, a routing rule for a corresponding Unique Identifier (UID) may be registered through a Client Application Routing Policy (CARP) or a UE Route Selection Policy (URSP), and traffic generated by the corresponding UID may be transmitted and received through a FOC-dedicated PDU session. According to an embodiment, the URSP may indicate a route selection (or configuration) policy of the electronic device 101 (for example, user terminal) defined in the 3GPP standard, and may be received from an AMF through modem (or Communication Processor (CP)) of the electronic device 101 while being inserted into a Non-Access Stratum (NAS) message. According to an embodiment, the CARP is a route selection (or configuration) policy of the electronic device 101 defined in various embodiments, and may be received, for example, through an application layer (for example, MSA 320 or MSE 330) of the electronic device 101 in an environment in which the URSP of the 3GPP is not available.

According to an embodiment, the MSA 320 (for example, service agent) may process an authentication procedure (for example, Authentication/Authorization (AA) procedure) related to the MEC service with the Authentication/Authorization (AA) server 380 (for example, authentication server) of the external server 300. For example, the MSA 320 may serve to transfer the received URSP rule and/or MEC access token to the MSE 330 as the result of AA. According to an embodiment, the MSA 320 may serve to detect an application event (for example, launch or end) or transfer a specific event to the application. According to various embodiments, the MSA 320 of the electronic device 101 may include the AA client 325. According to an embodiment, the AA client 325 may be provided by a producer (or manufacturer) that produces the electronic device 101 or an operator (for example, service provider). According to an embodiment, the MSA 320 may perform Authentication/Authorization) on the basis of subscriber identification information of the electronic device 101 through the AA client 325. The subscriber identification information may include, for example, a Subscriber Identity Module (SIM), a Universal SIM (USIM), an International Mobile Equipment Identity (IMEI), or a Generic Public Subscription Identifier (GPSI). For example, the MSA 320 may be an application (or software) for providing an authentication and authorization function to use a service (for example, MSE service) by the MSE 330 through communication with the AA server 380 on the basis of the subscriber identification information. According to an embodiment, the MSE service may collectively refer to services such as, for example, MEC, FOC, MMS, or Ultra-Reliable and Low Latency Communication (URLLC) through the MSE 330.

According to an embodiment, when the MSA 320 is authenticated and authorized for the MSE service through communication with the AA server 380, the MSA 320 may activate/deactivate (enable/disable) the MSE 330 using an MSE Application Programming Interface (API) for the authorized service type, register a UID and a rule of the client application (for example, ApnSettings) which can be used for each service type, and make a request for configuring routing. According to an embodiment, the MSE API may include an API provided from the electronic device 101 to a higher application layer for enabling/disabling of each MSE service type and routing rule setting for each UID. According to an embodiment, the MSE API may include an API for configuring at least one policy such as a policy for the MEC discovery procedure or a context monitoring policy. According to an embodiment, the client application 310 may access the corresponding service (for example, MEC or FOC) through the authentication and authorization procedure with the MSA 320.

According to an embodiment, when the MSA 320 is implemented by the operator (for example, service provider), for example, when the operator directly develops the MSA (for example, operator MSA) using the MSE service, the MSA 320 may directly perform the authentication and authorization procedure for the use of the MSE service through the AA server 380. According to an embodiment, the MSA 320 may receive an application-specific routing rule (for example, Data Network Name (DNN) (=APN in LTE) information when a dedicated PDU session is used) from the AA server 380 in the authentication and authorization procedure. According to an embodiment, in order to use the MSE API, the MSA 320 should be able to perform the authentication and authorization procedure between the MSA 320 and the electronic device 101. For example, when the MSA 320 is installed in advance in the electronic device 101, the MSA may be authenticated by a platform key through signing of the MSA app APK. According to an embodiment, when the electronic device 101 includes (or supports) an authentication module, the authorization of the MSE API may be acquired through a separate authentication procedure with the authentication module within the electronic device 101 after the MSA 320 is installed. According to an embodiment, when the MSE service authentication procedure is completed, the MSA 320 may call the MSE API on the basis of the received policy to generate/end the PDU session and configure the routing rule.

According to an embodiment, when configuring a data path of an application for MEC, the electronic device 101 may configure a data path (for example, path ⓐ, path ⓑ, or path ⓒ) to stop by at least one of various entities (for example, an MEC Enabling Layer (MEL) 331), a URSP Handling Layer (UHL) 333, or a Domain Name System (DNS) Handling Layer (DHL) 335) of the MSE 330. According to an embodiment, when configuring a data path of an application for MEC, the electronic device 101 may differently configure a data path on the basis of the use of a default PDU session (for example, path ⓐ) or the use of a separate dedicated PDU session (for example, path ⓑ or path ⓒ). According to an embodiment, when the separate dedicated PDU session is used, the data path of path ⓑ or path ⓒ may be determined according to whether the MEC discovery procedure is performed through the MEL 331 of the MSE 330.

According to an embodiment, the MSA 320 may configure (for example, configuring a path of the service to be path ⓒ) the dedicated PDU session by directly transmitting a request to the UHL 333 of the MSE 330 without stopping by the MEL 331 of the MSE 330. For example, when the electronic device 101 executes a sponsored application, if an appointment with a specific server or network is made in advance, the MSA 320 may transmit a request to the UHL 333 and provide the corresponding service through the dedicated PDU session. According to an embodiment, the MSA 320 may further generate separate information for identifying the service or receive the same from an external service and then provide the same to the UHL 333.

According to various embodiments, the electronic device 101 may include the MSE 330 (for example, service enabler) in a lower layer of the MSA 320.

According to an embodiment, the MSE 330 may provide an MSE API to the MSA 320 such that the client application 310 can use the MEC service (or MSE service) through the MSA 320, and accordingly a routing table for the used PDU session may be configured for each application. According to an embodiment, the MSE 330 may configure a routing table for the PDU session path to be used for each application ID or each URI and store the same in the memory (for example, the memory 130 of FIG. 1 or 2). According to an embodiment, the MSE 330 may configure at least one of the application ID and the URI as a target to configure the PDU session path. The URI may include a domain name or an IP address form. For example, the PDU session path for each application ID may be configured as, for example, "AppID 1: PDU session 1, AppID 2: PDU session1, AppID 3: PDU session 2". For example, the PDU session path for each URI may be configured as "URI 1: PDU session 1, URI 2: PDU session2". For example, the PDU session path for each application ID and each URI may be configured as, for example, "AppID 1 & URI 1: PDU session 3, AppID 2 & URI 1: PDUsession 1".

According to an embodiment, the MEC service may collectively refer to procedures required for using the MEC application (or Mobile Edge (ME) application), services provided through the MEC application, and information-related services provided to the MEC application. According to an embodiment, the MSE 330 may support additional functions such as MEC service discovery, location verification, route selection, performance verification, or mobility support for the MEC service.

According to various embodiments, in the state in which the MSE 330 is connected to at least one MEC host (or MEC application), the MSE 330 may configure the dedicated PDU Session or the default PDU Session to provide a specific service. According to an embodiment, information required for configuring the dedicated PDU session or the default PDU Session may be received by modem (or Communication Processor (CP)) of the electronic device 101 from the AMF/PCF server 390 through Non-Access Stratum (NAS) information.

According to an embodiment, the MSE 330 may include the MEL 331, the UHL 333, and the DHL 335.

According to an embodiment, the MEL 331 may perform a task required for using the MEC service among MSE services. For example, the MEL 331 may process operations such as MEC service registration, MEC service discovery, route selection (for example, DNN handling), performance pre-measurement, location services, and/or mobility handling.

According to an embodiment, in the MEC service registration, joining of the electronic device 101 may be authenticated by the MMP server 370 (or LCM proxy server) or an MEC solution provider server on the basis of USIM or account (for example, log-in) information, and a token (for example, cookie) suitable for an MEC service authorization level may be received and stored in the memory (for example, the memory 130 of FIG. 1 or 2). A request for the MEC service thereafter may be made using the corresponding token for an effective time of the token.

According to an embodiment, in the MEC service discovery, when the electronic device 101 enters an area in which the MEC service is possible (for example, accesses a specific cell ID or enters an LADN area), the MEL 331 may detect the entry, receive at least one of an app list (for example, MEC App (name) list) which can be used in the corresponding area or a domain name (for example, domain name for each MEC application), and perform various functions according to user settings. For example, the MEL 331 may provide an available MEC application notification, DNS proxying, and/or MEC application activation according to user settings. According to an embodiment, the MEL 331 may provide a notification for the available MEC application. For example, the currently available MEC application may be displayed on a notification window or by an application icon (for example, app icon). According to an embodiment, a notification of installation of the client application corresponding to the corresponding MEC application may displayed on the electronic device 101.

According to an embodiment, the MEL 331 may provide DNS proxying. For example, when a DNS query for the corresponding domain name is generated when the client application accesses the MEC application, if at least one of the corresponding application name and DNS query matches the MEC app list, the MEL 331 may transmit the corresponding DNS query to a DNS server for MEC, receive an access IP address of the corresponding MEC application, and return the access IP address to the client application 310. According to an embodiment, the corresponding IP address may be stored in a DNS cache for MEC within the electronic device 101, for example, for an effective period. MEC DNS resolving for the domain name in the MEC app list may be performed by the MEL 331 by itself separated from the DNS query of the client application and may be stored in the DNS cache for MEC.

According to an embodiment, the MEL 331 may provide MEC application activation. For example, when the MEC client application installed in the electronic device 101 is being used or is expected to be used, a request for MEC application activation (for example, instance generation (instantiation)) interworking therewith may be made. According to an embodiment, when the corresponding MEC application is not installed in an MEC host in an access area of the electronic device 101, a request for the installation (including a package URI) may be made.

According to an embodiment, in route selection (for example, DNN handling), when the use of the dedicated PDU session for the MEC service or the MEC application is desired without the use of the default PDU session, a routing rule for the UID of the client application may be configured. According to an embodiment, the MSE 330 may receive dedicated DNN information for the MEC service or the MEC application from a predefined profile or the AA server 380 and make a request for generating the MEC-dedicated PDU session by using a UHL API (not shown).

According to an embodiment, the performance pre-measurement may include, for example, pre-performance tests for a plurality of candidate MEC hosts by the MEL 331. For example, the MEL 331 may select an optimal MEC host through a pre-performance (for example, ping probing or bandwidth estimation) test.

According to an embodiment, the location services may include, for example, provision of services on the basis of an area in which the electronic device 101 is located. According to an embodiment, the MEL 331 may provide information on service availability (or location accuracy) at the corresponding location of the electronic device 101. For example, information on service availability may include, for example, information such as location confirmed, location not found, or location spoofed.

According to an embodiment, the mobility handling may provide, for example, handling for service continuity in an area in which a handover is generated. For example, the MEL 331 may process a handover from the MEC host to another MEC host or a handover from the MEC host to a remote host.

According to an embodiment, the MEL 331 may control discovery of the MEC application of the MEC host and identify the service type through communication with the MMP server. For example, the MEL 331 may identify a service by a predefined MSE API call. In another example, the MEL 331 may identify a service according to a policy received from a service provider server (for example, the AA server 380) or the MMP server 370.

According to an embodiment, in the case of a service using, for example, the default PDU session on the basis of the identification result of the service, the MEL 331 may configure a path of the service (for example, path stopping ⓐ) by the DHL 335 and accordingly provide the MEC service by the MEL 331 and the DHL 335. According to an embodiment, in the case of data path ⓐ for the application for MEC, the MEL 331 may be configured to provide a service through the default PDU session. According to another embodiment, in the case of a service using, for example, the dedicated PDU session on the basis of the identification result of the service, the MEL 331 may configure a path (for example, path ⓑ) of the service stopping by the MEL 331, the UHL 333, and the DHL 335 and provide the corresponding service by the MEL 331, the UHL 333, and the DHL 335. According to an embodiment, in the case of data path ⓑ for the application for MEC, the MEL 331 may configured to provide the service through the dedicated PDU Session by transmitting a request for the UHL 333. According to an embodiment, in order to identify the above-described various services, the MSA 320 may further provide separate information to the MEL 331 or the MEL 331 may receive (or acquire) relevant information from the MMP server 370.

According to an embodiment, the UHL 333 may make a request for the dedicated PDU session for each service type according to the API call and perform binding to be the dedicated PDU session configured for the corresponding application.

According to an embodiment, the DHL 335 may support a DNS pre-resolving or DNS proxy function in a $3^{rd}$ party application. For example, when a DNS query for access of the client application for MEC to a specific service is generated in the state in which data connection is made through the existing default PDU session, the DNS proxy may hook the DNS query and transfer the query to the DNS server through a domain name for MEC or look up in the DNS cache and return the corresponding MEC domain IP address. Accordingly, the $3^{rd}$ party application may provide the MEC service without any modification of separate software and without any separate traffic filtering (or steering) work of the operator.

According to an embodiment, the AA server 380 may provide authentication and authorization for the use of the MSE service. According to an embodiment, the MSA 320 of the electronic device 101 may receive authorization for each service type according to authentication and subscriber information through the AA server 380. According to an embodiment, the MSA 320 may authenticate the MSE service-available client application. According to an embodiment, the authentication procedure between the AA server 380 and the electronic device 101 may use the default PDU Session connected to the current Internet through communication such as, for example, LTE or Wi-Fi without a separate PDU session.

According to an embodiment, the MMP server 370 may be a proxy server communicating with electronic device 101 for authentication of the electronic device 101 or the control of MEC. According to an embodiment, the MMP server 370 may exchange a request/response message on the basis of, for example, a Hypertext Transfer Protocol (HTTP). According to an embodiment, when the electronic device 101 can perform direct communication with the AA server 380 or an MMC solution provision server, the LCM proxy may not be needed. For example, when a server API provided by the LCM proxy is used, the authentication request message of the MSA 320 may be forwarded to the AA server 380 to be authenticated, and the MEC control message may be transferred to the MEC solution provision server. In various embodiments, an interlocking API between the MSA 320 and the MMP server 370 or an entitlement server may be omitted, and information required for the AA procedure (for example, authentication and authorization procedure) may be received in advance.

According to an embodiment, when MEC is supported in the 5G New Ratio (NR) standard, the Access and Mobility Function (AMF)/Policy Control Function (PCF) server 390 may register MMP information and a URPS rule in the PCF and receive corresponding information from the AMF through NAS signaling.

As described above, according to various embodiments, the MSA 320 may perform authentication through communication with the AA server 380, make a request for desired information (for example, authentication and authorization), and receive and acquire the requested information from the AA server 380. According to various embodiments, the MSE 330 may make a request for desired information through communication with the MMP server 330 and receive and acquire the requested information from the MMP server 330. For example, the MSE 330 may acquire an MEC app list through communication with the MMP server 370 or perform the MMC service discovery procedure and configure the connection with at least one specific MEC host (or MEC application).

According to various embodiments, as described in the part with reference to FIG. 3, various service scenarios below may be provided when the data path of the application for MEC is configured on the basis of the electronic device 101 including the MSA 320 and the MSE 330.

1. Scenario of First Data Path (for Example, Path ⓐ) (for Example, MSE on Single PDU Session)

The scenario of the first data path (for example, path ⓐ) according to an embodiment may indicate a scenario for making the connection to the MEC application by using the default PDU session (or Public Data Network (PDN) connection) used for the existing Internet data by the client application. According to an embodiment, the MEL 331 may perform the MEC discovery procedure, make a request for the execution of and the connection to an MEC application to the MEC host close to the electronic device 101, and receive a URI of the corresponding MEC application. When the client application 310 makes a request for access to the corresponding MEC application, the access may be performed through an MEC application IP address acquired through DNS resolving for the corresponding URI. According to an embodiment, since a separate PDU session for the MEC service is not used in the scenario of the first data path (for example, MSE on Single PDU Session), the UHL 333 controlling the URSP rule may not intervene in the operation.

2. Scenario of Second Data Path (for Example, Path ⓑ) (for Example, MSE on Multiple PDU Sessions with MEL)

The scenario of second data path (for example, path ⓑ) according to an embodiment may indicate a scenario of making the connection to the MEC application by generating a separate MEC-dedicated PDU session as well as the default PDU session (or PDN connection) for the existing Internet by the client application. According to an embodiment, the generation of the MEC-dedicated PDU session may comply with a service provider (for example, a Mobile Network Operator (MNO) or the MMP server 370) policy, and the MSA 320 or the authenticated client application 310 may generate the same through the UHL 333 using the MSE API. According to an embodiment, with respect to the MEC-dedicated PDU session, one or more PDU session as well as the default PDU session may be always opened, and may be dynamically generated or released by a request from the MEL 331 as necessary at a specific time point. According to an embodiment, the UHL 333 of the MSE 330 may support routing of traffic for the corresponding client application (or UID) or the access URI to the MEC-dedicated PDU session according to a predefined rule (for example, CARP or URSP rule) or a routing rule received from an external server (for example, the MMP server 370, the AA server 380, or the AMF/PCF server 390).

3. Scenario of Third Data Path (for Example, Path ⓒ) (for Example, MSE on Multiple PDU Sessions without MEL)

According to an embodiment, the scenario of the third data path may indicate a scenario of generating and using only the dedicated PDU session for a specific service without any function of the MEL 331. According to an embodiment, a separate dedicated PDU session may be generated using the MSE API in the MSA 320 or the authenticated client application 310, an application (for example, UID) rule using the corresponding PDU session may be registered, and traffic of the corresponding application may be routed to the corresponding PDU Session. According to an embodiment, a scheme such as the scenario of the third data path (for example, MSE on Multiple PDU Sessions without MEL) may be used in various types of services (for example, FOC, MMS, or URLLC) requiring the dedicated PDU session as well as MEC.

The electronic device 101 according to various embodiments of the disclosure may include a network interface 420 and the processor 120, and the processor 120 may acquire information on applications which can be provided by at least one external server from the at least one external server within a base station or which can be connected through the base station using the network interface, select an external server including an application corresponding to a predetermined condition on the basis of the information on the applications, and transmit data to the selected external server.

According to various embodiments, the processor 120 may transmit a request message making a request for the information on the applications to the at least one external server, receive a response message including the information on the applications from at least one external server, and acquire the information on the applications from the response message.

According to various embodiments, the processor 120 may designate a condition of the information on the applications in the request message and transmit the same to the at least one external server.

According to various embodiments, the request message may include at least one of clientappName, locationInfo, deviceType, serviceType, contextType, or URI Request.

According to various embodiments, the response message may include at least one of referenceURI, clientAppName, clientAppPackageURL, uriTTL, uriLOC, carpRule, DNN, S-NSSAI, accessType, sessionType, mptcp, or fqdnList.

The electronic device 101 according to various embodiments of the disclosure may include the network interface 420 and the processor 120, and the processor 120 may acquire an app list of applications which can be serviced from a predetermined external server on the basis of a discovery policy, acquire information on an application to be accessed, which is associated with a client application of the electronic device, on the basis of the app list from the predetermined external server, determine a host for data transmission on the basis of the acquired information, and transmit data to the host.

According to various embodiments, the processor 120 may include a service agent for performing an operation related to authentication and authorization through communication with the external server and a service enabler for acquiring an app list through communication with the external server and performing an operation related to discovery.

According to various embodiments, the processor 120 may activate the service enabler through an API between the service agent and the service enabler and perform a discovery procedure with the external server through the service enabler.

According to various embodiments, the processor 120 may include a configuration of the discovery policy in the service enabler by the service agent, and the discovery policy may include a client application name (clientAppName) and a discovery policy (discoveryPolicy), and the discovery policy (discoveryPolicy) may include at least one of information on whether a dynamic DNN (dynamicDnn) is used, location information (locationInfo), a device type (deviceType), a service type (serviceType), or a context type (contextType).

According to various embodiments, the processor 120 may activate the service enabler on the basis of reception of the discovery policy from the service agent and make a request for an app list which satisfies a predetermined condition to a proxy server according to the discovery policy through the service enabler.

According to various embodiments, when there is no application associated with the client application in the app list, the processor 120 may make a request for a URI of the application to the proxy server through the service enabler and, when there is an application associated with the client application in the app list, may insert and transmit an application name of the application to the proxy server.

According to various embodiments, when there is no application in the proxy server, the processor 120 may acquire an application package URI for downloading or installing the application from the proxy server.

According to various embodiments, the processor 120 may transmit a DNS query through the URI for the application through the service enabler and store an IP address acquired in response to a DNS response to the DNS query in a local DNS cache.

According to various embodiments, when a candidate IP list for a plurality of hosts is received from the external server, the processor 120 may be configured to select the host on the basis of additional information, and the additional information may include information on a host location, a current user location, a user speed, or the host performance.

The electronic device 101 according to various embodiments of the disclosure may include the network interface 420 and the processor 120, and the processor 120 may acquire an app list of applications which can be serviced from a predetermined external server on the basis of a discovery policy, acquire information related to an application to be accessed, which is associated with a client application, from the predetermined external server on the basis of an event related to the creation of context by the client application, select a host for data transmission on the basis of the acquired information, and transmit data to the host.

According to various embodiments, the event related to the creation of the event may include at least one of the execution of the client application, a request for creating context by the client application, or the generation of a DNS query by the client application.

According to various embodiments, the discovery policy may include a client application name (clientAppName) and a discovery policy (discoveryPolicy), and the discovery policy (discoveryPolicy) may include at least one of information on whether a dynamic DNN (dynamicDnn) is used, location information (locationInfo), a device type (deviceType), a service type (serviceType), or a context type (contextType).

According to various embodiments, the processor 120 may make a request for an app list which satisfies a predetermined condition to the proxy server according to the discovery policy.

According to various embodiments, the processor 120 may make a request for a URI of the application to the proxy server when there is no application associated with client application in the app list, and insert and transmit an application name of the application to the proxy server when there is an application associated with the client application in the app list. When there is no application in the proxy server, the processor 120 may acquire an application package URI for downloading or installing the application from the proxy server.

According to various embodiments, the processor 120 may transmit a DNS query through the URI for the application and store an IP address acquired in response to a DNS response to the DNS query in a local DNS cache.

Hereinafter, a method of operating the electronic device 101 according to various embodiments is described. For example, hereinafter, various embodiments of receiving authentication and authorization (for example, Authentication/Authorization (AA)) and a policy (for example, an app routing policy, a discovery policy, or a monitoring policy) according to various embodiments on the basis of the electronic device 101 including the MSA 320 and the MSE 330 and performing a route configuration based on the received policy and an MEC discovery procedure are described.

Operations performed by the electronic device 101 described below may be performed by at least one processor of the electronic device 101 (for example, at least one processor including a processing circuit, for example, the processor 120 of FIG. 1). According to an embodiment, operations performed by the electronic device 101 may be stored in a memory (for example, the memory 130 of FIG. 1) and executed by instructions causing the processor 120 when executed.

According to various embodiments, the electronic device 101 may perform wireless communication through an access node (not shown) disposed between the MEC Management Proxy (MMP) server 430 and the electronic device 101.

For example, for an edge computing service (for example, an MEC service), network entities interworking with an MEC service module (not shown) including a service agent 320 (for example, Multi-access Service Agent (MSA)) and a service enabler 330 (for example, Multi-access Service Enabler (MSE)) within the electronic device 101 may be indicated.

According to various embodiments, in a control path between the service agent (for example, MSA) 320 and the service enabler 330 (for example, MSE), and the MMP server 370, authentication, authorization, and discovery procedures may be performed in the example of FIG. 3. According to an embodiment, after the discovery procedure, an MEC data service may be provided through a data path (for example, MEC user plane) between applications (for example, first App and second App) of the electronic device 101 and MEC applications (for example, first MEC App and second ME App—not shown) connected to the MMP server 370. Although not illustrated in FIG. 3, through a Domain Name System (DNS) query/response data path, the electronic device 101 may perform data communication with a DNS server.

According to an embodiment, the MMP server 370 may provide a user application interface (see: ETSI MEC 016 standard) for an edge computing system (for example, MEC system) to a User Equipment (UE) (for example, the electronic device 101). For example, the electronic device 101 may make a request for information on application(s) which can be provided by the MEC system (for example, available application list) to the MMP server 370 and transfer an execution request (for example, context creation) and stop request (for example, context termination) for a specific application to the MEC system. In another example, the MMP server 370 may manage life cycles of the applications installed in the MEC system. For example, the MMP server 370 may receive a request from the electronic device 101, transmit the received request to the MEC system, and manage life cycles of the applications installed in the MEC system.

According to an embodiment, the MEC service module may include the service agent 320 (for example, MSA) and the service enabler 330 (for example, MSE). According to various embodiments, the MEC service module may receive and process authentication and authorization (for Authentication/Authorization (AA)) and a policy (for example, an application routing policy, a discovery policy (or a monitoring policy)) (for example, an information list to be monitored). According to an embodiment, the MEC service module may receive Authentication/Authorization (AA) and the policy (for example, the information list to be monitored) through the service agent 320 (for example, MSA) and perform a route configuration based on the received policy and the MEC discovery procedure through the service enabler 330 (for example, MSE).

According to various embodiments, the MEC service module may operate to allow at least one of the entities within the MEC service module (for example, the service agent (MSA) 320 or the service enabler (MSE) 330) to monitor the MEC discovery condition, and transmit the result monitored by the corresponding entity to the service enabler (MSE) 330. According to an embodiment, the MEC service module may acquire an AA and discovery-related policy through the service agent (MSA) 320. According to an embodiment, when the service agent 320 performs monitoring, if the MEC discovery condition is monitored by the service agent 320 and is satisfied, the service agent may transfer an MEC discovery request to the service enabler 330 and perform the MEC discovery procedure through the service enabler 330. According to another embodiment, when the service enabler 330 performs monitoring, the service agent 320 may transfer a policy to the service enabler 330, and the service enabler 330 may monitor the MEC discovery condition according to the transferred policy and, if the condition is satisfied, perform the MEC discovery procedure.

According to an embodiment, the service agent 320 may monitor context information of the electronic device 101. The context information may be, for example, at least one piece of information on an application supporting data transmission based on MEC among the applications installed in the electronic device 101, information related to mobility of the electronic device 101, application life cycle information, information related to the state of the electronic device 101, information acquired by a sensor, or network performance. The information related to mobility of the electronic device 101 may include at least one piece of information indicating movement of the electronic device 101, information related to a change in a base station connected to the electronic device 101, and information related to whether the electronic device 101 enters a predetermined area. The predetermined area may be at least one of a Local Area Data Network (LADN), a tracking area, a cell of a base station, an area in which a handover between base stations is generated, or an area determined by a location-based service (for example, cellular, satellite, or Wireless Fidelity (Wi-Fi)-based location measurement technology). The application life cycle information may indicate, for example, a state (for example, life cycle) of an application having a series of cycles. The information on the state of the electronic device 101 may be, for example, at least one of an on/off state of a display (for example, the display device 160 of FIG. 1), a state of a battery (for example, the battery 189 of FIG. 1), a used state of a memory (for example, the memory 130 of FIG. 1), a received signal strength, time-out information, or a used state of a CPU (for example, the processor 120 of FIG. 1). The information acquired by the sensor may be, for example, information acquired by the sensor module 176 described in FIG. 1. The network performance may be, for example, at least one of a frequency bandwidth of the network to which the electronic device 101 is connected or latency. The service agent 412 according to various embodiments is described in detail with reference to the following drawings.

According to an embodiment, the service enabler 330 may manage (or process) MEC-based data transmission of applications on the basis of monitored context information.

For example, when an event related to mobility of the electronic device 101 is detected without any individual request for information to the MMP server 370 by a plurality of applications, the service enabler 330 according to various embodiments may reduce load of the electronic device 101 by making a request for information related to applications (for example, MEC applications) which can be provided by the MEC system to the MMP server 370 or receiving the same.

In another example, the service enabler 330 may determine whether at least one of the MEC applications or the applications included in the electronic device 101 satisfies a predetermined condition by which MEC-based data transmission can be performed, and notify at least one application of performance of the MEC-based data transmission such that the corresponding application performs the data transmission. When at least one application satisfying the predetermined condition is not installed in the electronic device 101, the service enabler 330 may lead to an application layer 443 and/or a framework (for example, the middleware 144 and/or the operating system 142) to install the application. For example, according to a request from the application layer 310, a new application may be installed in the electronic device 101. In various embodiments, the electronic device 101 may receive (or acquire) information on the new application (for example, URI, IP address, or application name) from the MEC system.

In another example, when a predetermined condition (hereinafter, referred to as a second condition) related to life cycle synchronization is detected, the service enabler 330 may make a request for life cycle synchronization to the MMP server 370 (for example, LCM proxy server) or an edge server (or MEC server) to reduce resource consumption of the edge server. For example, the service enabler 330 may notify the MMP server 370 of whether to use applications. According to an embodiment, the MEC applications may perform the operation (for example, data transmission) only when the application are being used, and the MEC applications may stop the operation (for example, data transmission) when the application is not being used (for example, at least one of screen off, client application background state change, and user movement speed higher than or equal to a predetermined speed is satisfied). According to an embodiment, the service enabler 330 may inform the MMP server 370 of whether to use the applications as described above, thereby efficiently managing resources of the MEC host (or edge server). According to an embodiment, with respect to applications which are not being used, resource allocation of the MEC application is released and thus resource consumption of the MEC host may be reduced.

In another example, unlike the method of individually performing the authentication procedure for MEC-based data transmission by a plurality of applications, the service enabler 330 may reduce network load by performing the authentication procedure for the electronic device 101 together with the MMP server 370 (or edge server).

Figure 4:
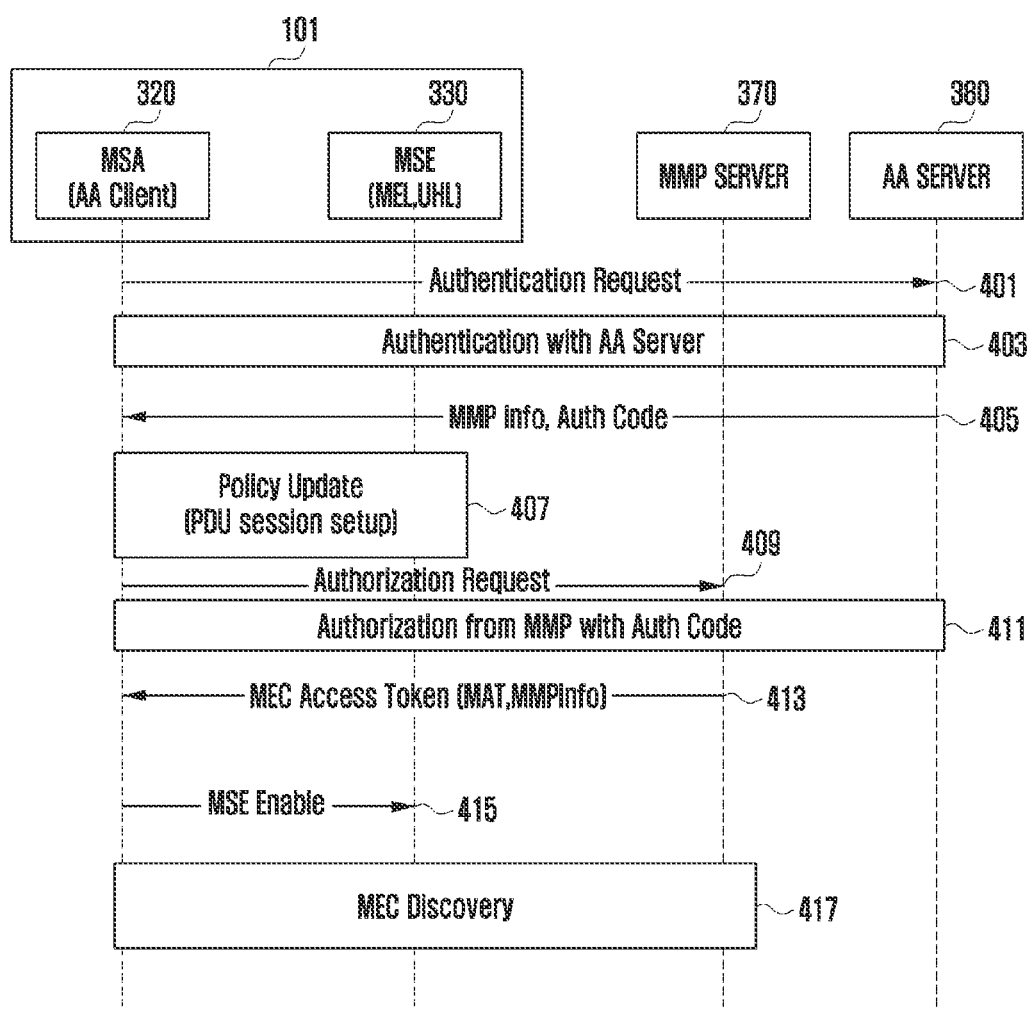
FIG. 4 illustrates an example of an authentication procedure according to various embodiments of the disclosure.

FIG. 4 illustrates an example of an authentication procedure according to various embodiments of the disclosure.

As illustrated in FIG. 4, the electronic device 101 may include an MSA (or service agent) 320 (for example, including the AA client 325) and an MSE (or service enabler) 330 (for example, including the MEL 331 and the UHL 333).

Referring to FIG. 4, in operation 401, the MSA 320 of the electronic device 101 may transmit a message (for example, a first request message) for an authentication (for example, first authentication) request to the AA server 380 on the basis of at least one authentication scheme (for example, first authentication). According to an embodiment, the MSA 320 may make a request for authentication with the AA server 380 by using a Generic Public Subscription Identifier (GPSI)-based Application-layer AKA scheme, an ID/password-based Login scheme, or a GBA scheme.

In operation 403, the MSA 320 may perform authentication with the AA server 380. According to an embodiment, the MSA 320 may perform GPSI-based user authentication with the AA server 380.

When receiving an authentication request from the electronic device 101, the AA server 380 may perform authentication with the electronic device 101 and, when the authentication is completed (for example, authentication procedure is completed), provide (or transmit) authentication information (for example, first authentication information) according to the authentication result to the electronic device 101 (for example, MSA 320) in operation 405. According to an embodiment, the authentication information may include, for example, MMP-related information (hereinafter, referred to as MMP Info) and authorization code (hereinafter, referred to as an Auth Code). According to an embodiment, the MMP server 370 may further include additionally (or selectively) required information as well as the above information, for example, at least one of an ID_token, or CARP or URSP rules for an MEC data service in the authentication information and provide the authentication information.

According to an embodiment, the MMP Info may include, for example, information related to access to the MMP server 370 (for example, an MMP access address). For example, the MMP Info may include address information of the new MMP server 370 to be accessed (for example, a Uniform Resource Identifier (URI) or an IP address) and information related to an effective and/or a place of the corresponding address information. According to an embodiment, the Auth Code may include, for example, a code (for example, based on QAuth2.0) required for making a request for an access token (for example, MAT or MEC access token) from the MMP server 370. According to an embodiment, the CARP or URSP rules may include, for example, relevant information (for example, DNN) for a PDU session setup, information related to an application (or application group) which can be used for each DNN, a DNN list which can be configured thereafter, or a maximum number of DNNs which can be configured.

When the authentication procedure with the AA server 380 is completed, the MSA 320 may perform a policy update with the MSE 330 (for example, PDU session setup) in operation 407. According to an embodiment, the MSA 320 may perform the PDU session setup according to the CARP rule or URSP rules (for example, DNN). For example, the MSA 320 may identify a policy indicating whether to perform the PDU session setup according to the CARP or URSP rules, and transfer a PDU session setup request to the MSE 330 through the MSE API according to the CARP rules or the URSP rules. The MSE 330 may perform the PDU session setup in response to the PDU session setup request from the MSA 320. According to an embodiment, the MSA 320 may change the default PDU session or additionally establish a new dedicated PDU session.

According to an embodiment, the operation of performing the policy update by the MSA 320 and the MSE 330 in operation 407 may be performed, for example, when the MSA 320 receives the CARP or URSP rules from the AA server 380. According to an embodiment, when the CARP or URSP rules are not provided from the AA server 380, the MSA 320 may not perform the policy update with the MSE 330. According to another embodiment, even though the CARP or URSP rules are provided from the AA server 380, the MSA 320 may not perform the policy update on the basis of its own determination or through an information exchange with the MSE 330.

After the authentication is completed (or after the policy update is performed with the MSE 330 or is omitted, the MSA 320 may transmit a message (for example, second message) for an authorization (for example, second authorization) request to the MMP server 370 in operation 409. According to an embodiment, the MSA 320 may make a request for authentication to the MMP server 370 on the basis of authentication information (for example, including an Auth Code or additionally an ID_token) acquired from the AA server 380.

In operation 411, the MSA 320 may perform authentication (for example, authorization procedure) with the AA server 380 through the MMP server 370. According to an embodiment, the MSA 320 may perform service authorization with the AA server 380 on the basis of the Auth Code.

In operation 413, the MMP server 370 may provide (or transmit) authentication information (for example, second authentication information) according to the authentication result to the electronic device 101 (for example, MSA 320) in response to the authentication request (for example, second request message) from the MSA 320. According to an embodiment, the authentication information may include, for example, an access token (for example, MAT or MEC access Token) and MMP Info. According to an embodiment, the MMP server 370 may transmit a response including the access token to the MSA 320 while the authentication of the MSA 320 is being performed or after the authentication of the MSA 320 is performed.

In operation 415, the MSA 320 may activate the MSE 330. According to an embodiment, when the MSA 320 receives authentication information (for example, access token (MAT)) according to the authentication result from the MMP server 370 while the authentication with the AA server 380 is being performed or after the authentication is performed, the MSA 320 may transmit the received authentication information (for example, access token (MAT)) to the MSE 330 to activate the MSE 330. According to an embodiment, the MSA 320 may transmit at least piece of additional information such as an access address (for example, a URI or an IP address) of a new MMP server 370 to be accessed, a DNS server address, or a DNN to be used to perform the MEC discovery procedure along with the authentication information (for example, authentication token (MAT)) to the MSE 330. According to an embodiment, the MSA 320 may activate (enable MEC) the MSE 330 on the basis of the received access token (MAT) and/or other additional information. According to an embodiment, when the MSA 320 performs authentication (for example, authorization) with the MMP server 370, the MSA 320 may receive the access token (for example, MAT) as the authentication result from the MMP server 370, call, for example, enableMecEnablingLayer(true, MMP Info, MAT) of the MSE API, and transmit MMP access information (MMP Info) and the access token (MAT) to the MSE 330.

In operation 417, the MSE 330 may receive the authentication information (for example, MAT) and/or other additional information (for example, MMP Info, DNS server address, or DNN to be used) and perform the MMC discovery procedure on the basis of at least the authentication information and/or the additional information. According to an embodiment, the MSE 330 may perform the MEC discovery procedure after accessing the corresponding MMP server 370 using the MMP Info and the MAT.

Although not illustrated in FIG. 4, according to another embodiment, the MSE 330 may perform authentication (for example, service authorization of operation 411) with the MMP server 370. According to an embodiment, when the MSE 330 performs authentication (for example, authorization) with the MMP server 330, the MSA 320 completing the authentication may first receive MMP Info, the Auth Code, and/or other additional information (for example, identification token (ID_token)) from the MMP server 370, call enableMecEnablingLayer(true, MMP Info, Auth Code, [ID-Token]) of the MSE API to activate the MSE 330, and transmit the same to the MSE 330. The MSE 330 may directly perform authorization with the MMP server 370 on the basis of information received from the MSA 320 and receive (or acquire) the MAT on the basis of the result thereof. For example, compared to the operation of FIG. 4, the entity performing the service authentication procedure for authorization in the internal configuration of the electronic device 101 may be divided into the MSA 320 and the MSE 330.

Figure 5:
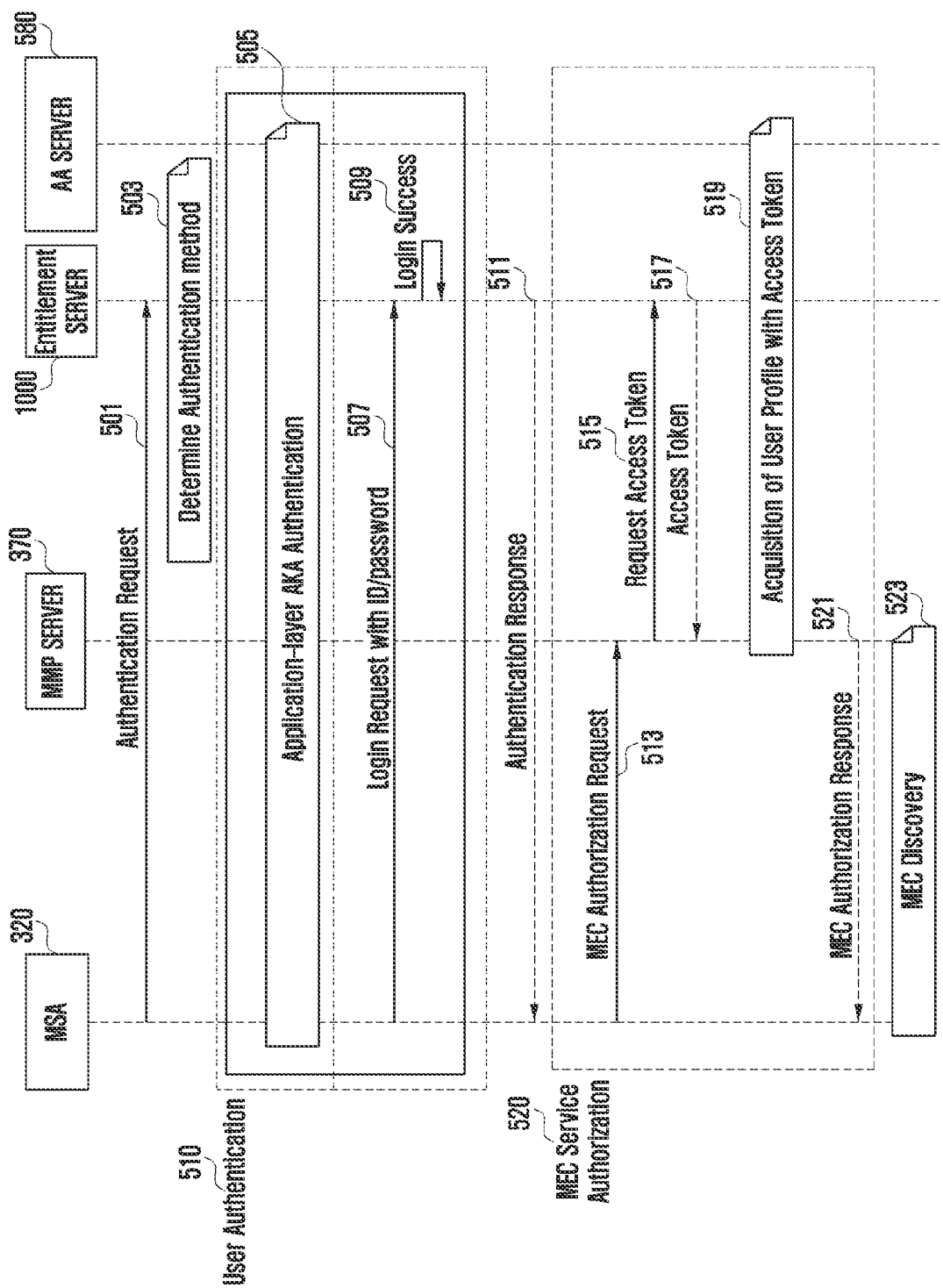
FIG. 5 illustrates an example of an authentication procedure according to various embodiments of the disclosure.

FIG. 5 illustrates an example of an authentication procedure according to various embodiments of the disclosure.

As illustrated in FIG. 5, FIG. 5 illustrates an example of signal flow for an authentication procedure (for example, scenario A related to Authentication/Authorization (AA)) and policy update) according to various embodiments. For example, FIG. 5 illustrates an example of MEC service authentication flow for scenario A in the authentication procedure according to various embodiments, and may include an operation (for example, operation 510) according to an embodiment of a User Authentication (or Subscriber Authentication) and operation (for example, 520) according to an embodiment of MEC Service Authorization. According to an embodiment, scenario A for MEC AA and policy update may indicate an example of a scenario of performing MEC Service Authorization (for example, operation 520) after User Authentication (for example, operation 510) as illustrated in FIG. 5.

Referring to FIG. 5, in operation 501, the MSA 320 of the electronic device 101 may transmit a message for an authentication request to an entitlement server 500.

In operation 503, the entitlement server 500 may determine an authentication method. According to an embodiment, the entitlement server 500 may determine an authentication method corresponding to the authentication request of the electronic device 101 in at least one predetermined authentication method. According to an embodiment, at least one authentication method may include, for example. Application-layer AKA or Login (for example, ID/password) type authentication using a GPSI. According to an embodiment, the MSA 320 may make a request for an authorization code while transmitting subscriber identification information (or terminal identification information) (for example, GPSI or IMSI) to the entitlement server 500. According to an embodiment, the MSA 320 and the entitlement server 500 may perform user authentication through an Application-layer AKA or Logging method as in operation 510.

According to an embodiment, in operation 505, the MSA 320 may perform an authentication (for example, MEC subscriber authentication) with the AA server 380 through the entitlement server 500 on the basis of an Application-layer AKA method and acquire an authentication response including authentication information according to the authentication result from the AA server 380. According to another embodiment, the MSA 320 may perform an authentication procedure with the entitlement server 500 on the basis of an ID/password-based Login method in operation 507, and acquire an authentication response including authentication information according to the authentication result from the entitlement server 500 on the basis of Login Success in the entitlement server 500 in operation 507.

In operation 511, the MSA 320 may receive an authentication response corresponding to the authentication request. For example, in operation 511, the MSA 320 may acquire authentication information (for example, MMP Info, Auth Code, ID_token, CARP rules, or URSP rules) according to the authentication result from the entitlement server 500 or from the AA server 380 through the entitlement server 500. For example, the MSA 320 may receive MMP-related information (for example, MMP access address) to perform the MEC discover procedure, an authentication code (for example, Auth code) for authorization, and an ID_token as the authentication result. According to an embodiment, the MSA 320 may receive information related to the CARP or URSP rules for the MEC data service on the basis of supporting by the AA server 380.

According to an embodiment, the MSA 320 may perform MEC Service Authorization as in operation 520 after User Authentication as in operation 510.

According to an embodiment, after completing authentication, the MSA 320 may transmit a message for an authorization request to the MMP server 370 in operation 513. For example, the MSA 320 may transmit the acquired authentication information (for example, including the Auth Code or additionally the ID_token) to the MMP server 370 and make a request for authorization for the MMP server 370. For example, after completing authentication, the MSA 320 may access the MMP server 370 on the basis of the MMP access address and perform the authorization procedure.

The MMP server 370 may make a request for the access token to the entitlement server 500 in operation 515, and acquire the access token from the entitlement server 500 in operation 517. According to an embodiment, the MMP server 370 may communicate with the entitlement server 500 or communicate with the AA server 380 through the entitlement server 500 and identify whether the electronic device 101 is an MEC service subscriber. According to an embodiment, when the MEC service subscriber is identified through the AA server 380, the MMP server 370 may issue (for example, authorization) the access token (for example, MAT) in the MSA 320.

In operation 519, the MMP server 370 may transmit the MMP information and the authorization code to the entitlement server 500 (or the AA server 380) and may make a request for and acquire the access token for user profile information access.

In operation 521, the MMP server 370 may transmit an authorization response corresponding to the authorization request to the MSA 320. According to an embodiment, the MMP server 370 may identify a user profile using the corresponding access token and, when it is identified that the MEC service is available on the basis of the user profile, may transmit an Authorization response including MMP Info, MAT, or CARP rules to the MSA 320.

According to an embodiment, in operation 521, the MSA 320 may acquire the access token (for example, MAT) as the result of the authorization procedure. According to an embodiment, when the MSA 320 performs the authorization procedure with the MMP server 370, the MSA 320 may receive the access token as the result of the authorization procedure and transmit the MMP information and the access token to the MSE 330 through the MSE API. According to another embodiment, when the MSE 330 performs the authorization procedure with the MMP server 370, the MSA 320 completing the authentication may first transmit the MMP information and the authorization code (Auth Code) received from the entitlement server 500 and selectively the ID_token to the MSE 330 through the MSE API. The MSE 330 may directly perform the authorization procedure with the MMP server 370 on the basis of the information transmitted from the MSA 320 and receive the access token as the result thereof.

In operation 523, the MSA 320 may perform the MEC discovery procedure using the MMP Info and the access token through the MSE 330.

Figure 6:
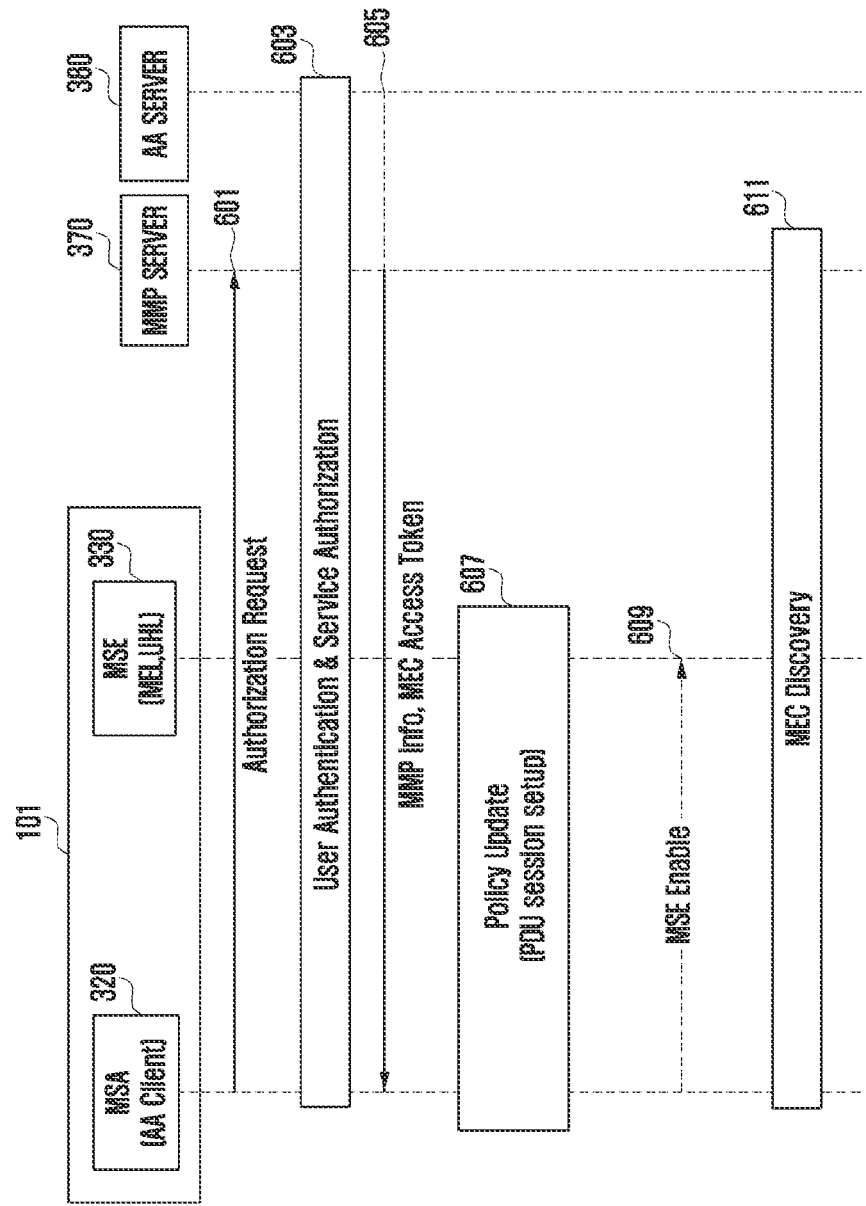
FIG. 6 illustrates an example of an authentication procedure according to various embodiments of the disclosure

FIG. 6 illustrates an example of an authentication procedure according to various embodiments of the disclosure.

As illustrated in FIG. 6, the electronic device 101 may include an MSA (or service agent) 320 (for example, including the AA client 325) and an MSE (or service enabler) 330 (for example, including the MEL 331 and the UHL 333).

Referring to FIG. 6, in operation 601, the MSA 320 of the electronic device 101 may transmit a message for an authorization request (for example, an authorization request message) to use the service to the MMP server 370 on the basis of at least one predetermined authentication method. According to an embodiment, when making a request for authorization for the use of the service to the MMP server 370, the MSA 320 may provide (or transmit) at least one or all of Mobile Network Operator (MNO) (for example, entitlement server 500) information and a Device ID (for example, IMSI, IMEI, GPSI, or separately allocated unique identifier) to the MMP server 370. According to an embodiment, the Device ID may include an identifier through which the MMP server 370 can uniquely identify the electronic device 101.

In operation 603, the MSA 320 may perform the authentication and authorization (Authentication & Authorization (AA)) procedure with the MMP server 370 or the AA server 380 through the MMP server 370. For example, when the MSA 320 transmits the authorization request to the MMP server 370, the MSA 320 may perform a trilateral message exchange between the MSA 320, the MMP server 370, and the AA server 380. According to an embodiment, the MSA 320 may perform user authentication and service authorization (or authorization) with the MMP server 370. For example, the MSA 320 may perform a procedure of identifying whether the electronic device 101 corresponds to a registered user and perform a procedure of identifying whether the electronic device can receive a corresponding service. According to an embodiment, since an AA method varies depending on MNO information, the MMP server 370 may perform AA according to the MNO information through a method suitable therefor.

When the MMP server 370 receives an authentication request from the electronic device 101, the MMP server 370 may perform authentication with the electronic device 101 and, when the authentication is completed (for example, authentication procedure is completed), provide (or transmit) authentication information according to the authentication result to the electronic device 101 (for example, MSA 320) in operation 605. According to an embodiment, the authentication information may include, for example, MMP Info and an access token (for example, MAT). According to an embodiment, the MMP server 370 may further include additionally (or selectively) required information as well as the above information, for example, at least one of the CARP or URSP rules for the MEC data service in the authentication information and provide the authentication information. According to an embodiment, in operation 605, the MSA 320 may receive all of the authentication information (for example, MMP Info, MAT, and CARP or URSP rules) according to the authentication result from the MMP server 370. According to another embodiment, in operation 605, the MSA 320 may receive a portion of the authentication information (for example, MMP Info and MAT for discovery) from the MMP server 370 and receive the CARP rules (or URSP rules) from the AA server 380 as the user authentication result.

According to an embodiment, the MMP Info may include, for example, information related to access to the MMP server 370 (for example, an MMP access address). For example, the MMP Info may include address information of the new MMP server 370 to be accessed (for example, a Uniform Resource Identifier (URI) or an IP address) and information related to an effective and/or a place of the corresponding address information. According to an embodiment, the access token (for example, MAT) may include, for example, an access token for identifying MEC discovery authorization. According to an embodiment, the CARP or the URSP rules may include, for example, DNN configuration-related information, information related to an application (or application group) which can be used for each DNN, a DNN list which can be configured thereafter, or a maximum number of DNNs which can be configured.

When the authentication procedure is completed, the MSA 320 may perform a policy update with the MSE 330 (for example, PDU session setup) in operation 607. According to an embodiment, the MSA 320 may perform the PDU session setup according to the CARP rule or URSP rules (for example, DNN). For example, when there are the URSP rules in the information received from the MMP server 370, the MSA 320 may update the URSP rules through the MSE API.

According to an embodiment, the operation of performing the policy update by the MSA 320 and the MSE 330 in operation 607 may be performed, for example, when the MSA 320 receives the CARP or URSP rules from the AA server 380. According to an embodiment, when the CARP or URSP rules are not provided from the AA server 380, the MSA 320 may not perform the policy update with the MSE 330. According to another embodiment, even though the CARP or URSP rules are provided from the AA server 380, the MSA 320 may not perform the policy update through its own determination or an information exchange with the MSE 330.

In operation 609, the MSA 320 may activate the MSE 330. According to an embodiment, when the MSA 320 receives authentication information (for example, access token (MAT)) according to the authentication result from the MMP server 370 while the authentication with the AA server 380 is being performed or after the authentication is performed, the MSA 320 may transmit the received authentication information (for example, access token (MAT)) to the MSE 330 to activate the MSE 330. According to an embodiment, the MSA 320 may transmit at least piece of additional information such as an access address (for example, a URI or an IP address) of a new MMP server 370 to be accessed, a DNS server address, or a DNN to be used to perform the MEC discovery procedure along with the authentication information (for example, authentication token (MAT)) to the MSE 330. According to an embodiment, the MSA 320 may activate (enable MEC) the MSE 330 on the basis of the received access token (MAT) and/or other additional information. According to an embodiment, when the MSA 320 performs authentication with the MMP server 370, the MSA 320 may receive the access token (for example, MAT) as the authentication result from the MMP server 370, call, for example, enableMecEnablingLayer(true, MMP Info, MAT) of the MSE API, and transmit MMP access information (MMP Info) and the access token (MAT) to the MSE 330.

In operation 611, the MSE 330 may receive the authentication information (for example, MAT) and/or other additional information (for example, MMP Info, DNS server address, or DNN to be used) and perform the MEC discovery procedure on the basis of at least the authentication information and/or the additional information. According to an embodiment, the MSE 330 may perform the MEC discovery procedure after accessing the corresponding MMP server 370 using the MMP Info and the MAT.

Figure 7:
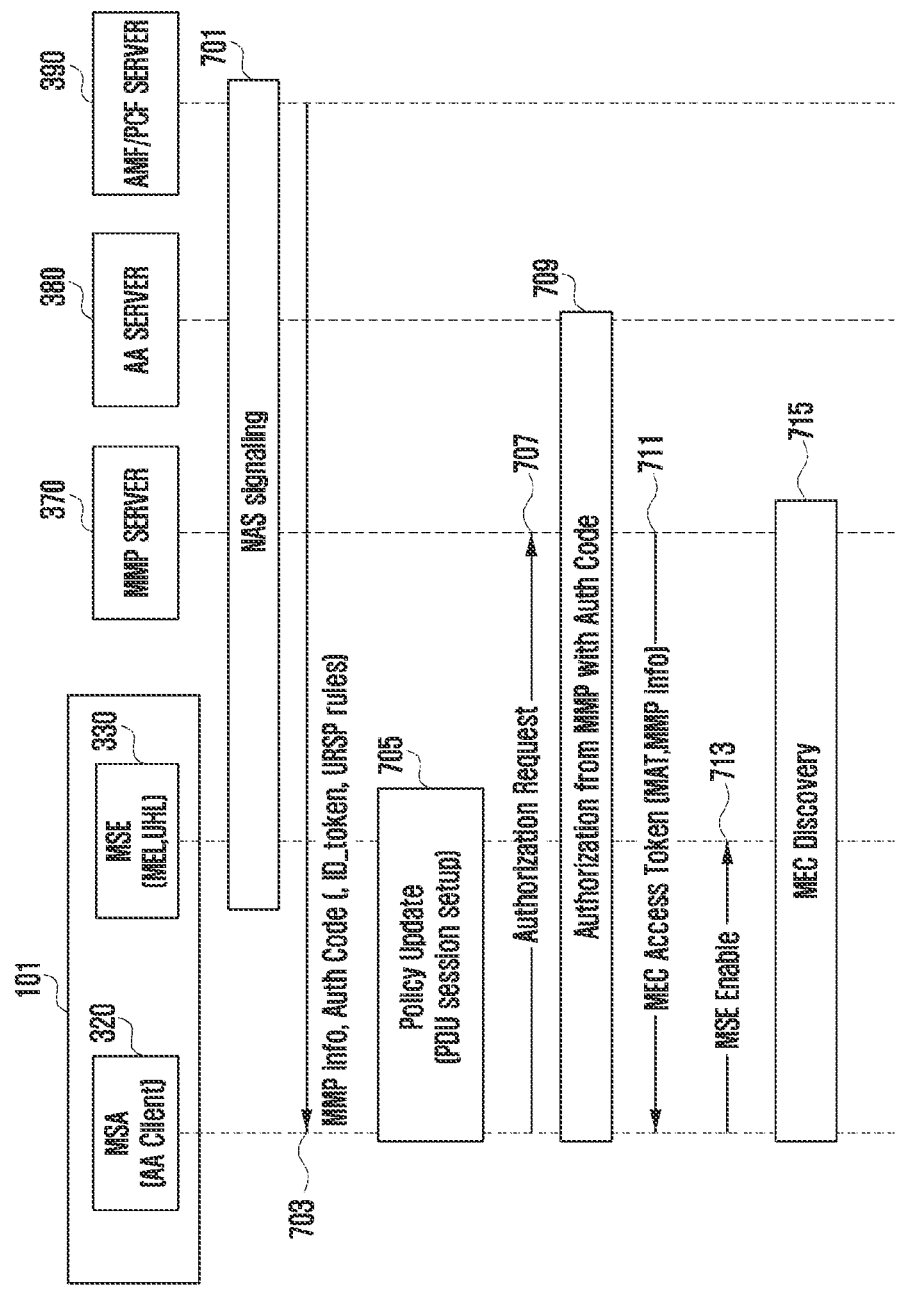
FIG. 7 illustrates an example of an authentication procedure according to various embodiments of the disclosure.

FIG. 7 illustrates an example of an authentication procedure according to various embodiments of the disclosure.

As illustrated in FIG. 7, the electronic device 101 may include an MSA (or service agent) 320 (for example, including the AA client 325) and an MSE (or service enabler) 330 (for example, including the MEL 331 and the UHL 333). According to an embodiment, the URSP may be added by the PCF of the AMF/PCF server 390 and information required for MMP access (for example, MMP Info, Auth Code, or ID_token) may be managed.

Referring to FIG. 7, in operation 701, the MSE 330 of the electronic device 101 may perform an NAS signaling procedure with the AMF/PCF server 390 (for example, AMF). According to an embodiment, the AMF/PCF server 390 may provide the MMP Info and the Auth Code to the electronic device 101 and additionally provide the ID_token and/or CARP or URSP rules. According to an embodiment, the MSE 330 may receive the NAS signaling message, which the modem (or communication processor) of the electronic device 101 receives from the AMF 390, through the UHL 333 of the MSE 330. For example, the modem of the electronic device 101 may acquire at least one piece of information among the MMP Info, the Auth Code, the ID_token, or the CARP or URSP rules from the NAS signaling message received from the AMF and transmit the acquired information to the MSA 320 through the UHL 333.

In operation 703, the MSE 330 may acquire at least one piece of information among the MMP Info, the Auth Code, and/or the ID_token from the NAS signaling message and transmit the acquired information to the MSA 320. According to an embodiment, the MMP Info may include, for example, information related to access to the MMP server 370 (for example, an MMP access address). For example, the MMP Info may include address information of the new MMP server 370 to be accessed (for example, a Uniform Resource Identifier (URI) or an IP address) and information related to an effective and/or a place of the corresponding address information. According to an embodiment, the CARP or the URSP rules may include, for example, DNN configuration-related information, information related to an application (or application group) which can be used for each DNN, a DNN list which can be configured thereafter, or a maximum number of DNNs which can be configured.

According to an embodiment, at least one piece of information among the MMP Info, the Auth Code, the ID_token, or the CARP or URSP rules provided from the AMF/PCF server 390 may be acquired by the MSA 320 through the MSE 330.

The MSA 320 may perform a policy update with the MSE 330 (for example, PDU session setup) in operation 705. According to an embodiment, the MSA 320 may perform the PDU session setup according to the CARP rule or URSP rules (for example, DNN). For example, when there are the URSP rules in the information received from the MMP server 370, the MSA 320 may update the URSP rules through the MSE API. According to an embodiment, the MSA 320 may perform the policy update with the MSE 330 when the information acquired through the NAS signaling message include the CARP or URSP rules. According to an embodiment, the MSA 320 may not perform the policy update with the MSE 330 when the information acquired through the NAS signaling message does not include the CARP or URSP rules. According to another embodiment, even though the CARP or URSP rules are provided, the MSA 320 may not perform the policy update on the basis of its own determination or through an information exchange with the MSE 330. According to an embodiment, the PDU session setup may be performed when the policy update between the MSA 320 and the MSE 330 is performed.

After receiving the NAS signaling message (or after performing or omitting the policy update with the MSE 330), the MSA 320 may transmit a message for an authorization request (for example, service authorization request) to the MMP server 370 in operation 707. According to an embodiment, the MSA 320 may make a request for authorization to use the service to the MMP server 370 on the basis of authentication information (for example, including the Auth Code or additionally the ID_token) acquired from the NAS signaling message.

In operation 709, the MSA 320 may perform authentication (for example, authorization procedure) with the AA server 380 through the MMP server 370. According to an embodiment, the MSA 320 may provide (or transmit) at least one or all of the Auth Code or the ID_token together with the AA server 380 to the MMP server 370 and make a request for service authorization.

In operation 711, the MMP server 370 may provide (or transmit) authentication information to the electronic device 101 (for example, MSA 320) in response to the authorization request (for example, authorization request message) from the MSA 320. According to an embodiment, the authentication information may include, for example, an access token (for example, MAT) and MMP Info. According to an embodiment, the MMP server 370 may transmit a response including the access token and the MMP Info to the MSA 320 during or after the authentication of the MSA 320.

In operation 713, the MSA 320 may activate the MSE 330. According to an embodiment, when the MSA 320 receives authentication information (for example, access token (MAT) and MMP Info) from the MMP server 370, the MSA 320 may transmit the received authentication information (for example, access token (MAT) and MMP Info) to the MSE 330 to activate the MSE 330. According to an embodiment, the MSA 320 may transmit at least one piece of additional information such as an access address (for example, a URI or an IP address) of a new MMP server 370 to be accessed, a DNS server address, or a DNN to be used to perform the MEC discovery procedure along with the authentication token (MAT) to the MSE 330. According to an embodiment, the MSA 320 may activate (enable MEC) the MSE 330 on the basis of the received access token (MAT) and/or other additional information. According to an embodiment, when the MSA 320 performs the authorization procedure with the MMP server 370, the MSA 320 may receive the access token (for example, MAT) from the MMP server 370, call, for example, enableMecEnablingLayer (true, MMP Info, MAT) of the MSE API, and transmit MMP access information (MMP Info) and the access token (MAT) to the MSE 330.

In operation 715, the MSE 330 may receive the authentication information (for example, MAT) and/or other additional information (for example, MMP Info, DNS server address, or DNN to be used) and perform the MEC discovery procedure on the basis of at least the authentication information and/or the additional information. According to an embodiment, the MSE 330 may perform the MEC discovery procedure after accessing the corresponding MMP server 370 using the MMP Info and the MAT.

Figure 8:
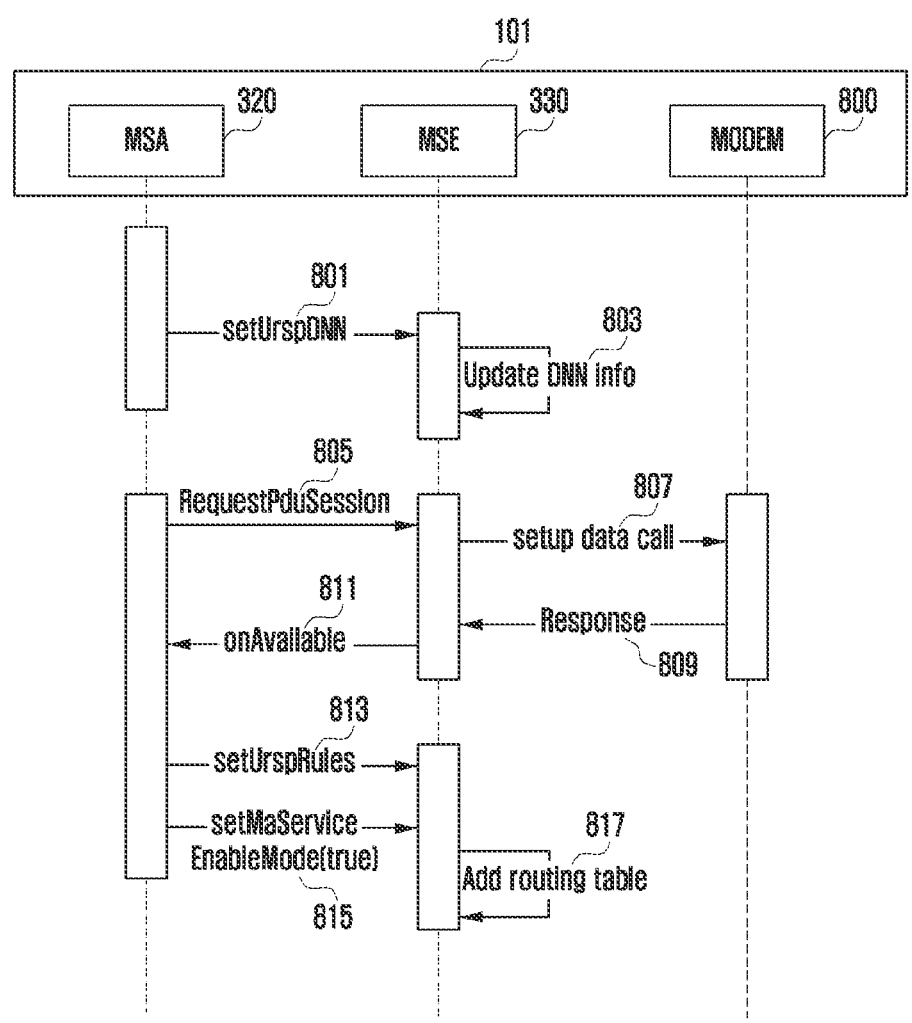
FIG. 8 illustrates an example of a policy update operation by the electronic device 101 according to various embodiments of the disclosure.

FIG. 8 illustrates an example of a policy update operation by the electronic device 101 according to various embodiments of the disclosure.

As illustrated in FIG. 8, FIG. 8 illustrates an example of PDU session establishment during policy update (for example, PDU session setup) and an example of the operation for dedicated DNN Activation in PDU session setup (or PDN connection establishment). According to an embodiment, the PDU session setup may include new PDU session establishment, existing PDU session release, and existing PDU session update (for example, a change in the setup for a characteristic for each PDU session (for example, QoS information such as a bandwidth or latency)), and FIG. 8 illustrates an example of PDU session establishment. According to an embodiment, the electronic device 101 may include the MSA (or service agent) 320, the MSE (or service enabler) 330, and a modem (or a Communication Processor (CP)) 800.

Referring to FIG. 8, when acquiring (or receiving) information on the DNN setup, the MSA 320 may provide (or transmit) a first message (for example, setUrspDNN) indicating configuring a DNN to the MSE 330 in operation 801.

In operation 803, the MSE 330 may update DNN information (for example, update DNN Info) on the basis of the first message (for example, setUrspDNN) provided from the MSA 320.

In operation 805, the MSA 320 may provide a second message (for example, requestPduSession) indicating the establishment of a PDU session (or PDN connection) to the MSE 330.

When receiving the second message (for example, requestPduSession), the MSE 330 may provide a third message (for example, setup data call) indicating data cell setup to the modem 800 in operation 807.

When receiving the third message (for example, setup data call) from the MSE 330, the modem 800 may configure a data call on the basis of pre-configured information for processing the service (for example, MEC service) or configure a data call on the basis of indicated information and provide a fourth message (for example, response message) corresponding to the third message to the MSE 320 in operation 809. According to an embodiment, the PDU session may be established on the basis of a request made by the modem 800 to establish the PDU session to a core network (for example, SMF—not shown) by the third message (for example, setup data call).

When receiving the fourth message (for example, response to data call setup request) from the modem 800, the MSE 330 may provide a fifth message (for example, onAvaible) informing of establishment of the PDU session to the MSA 320 in operation 811.

When the URSP rules are received using one of the above-described methods or received through other methods, the MSA 320 may provide a sixth message (for example, setUrspRules) indicating setup of the URSP rules to the MSE 330 in operation 813. According to an embodiment, in operation 815, the MSA 320 may provide a seventh message (for example, setMaServiceEnableMode(true)) indicating execution (true) of an MEC service activation mode (for example, MSE activation) to the MSE 330.

In operation 817, the MSE 330 may generate (or add) a routing table on the basis of the sixth message (for example, setUrspRules) and the seventh message (for example, setMaServiceEnableMode(true)) received from the MSA 320.

According to an embodiment, the URSP rules may include PDU session information used for each application or each URI, and the electronic device 101 (for example, MSE 330) may establish the PDU session through a setUrspDNN API when the PDU session under to URSP rules is not established. According to an embodiment, when establishing the PDU session, the electronic device 101 (for example, MSE 330) may configure a routing table through the setUrspRules API to configure a data path for the corresponding application ID (AppID) or the URI through the PDU session under the URSP rules.

Figure 9:
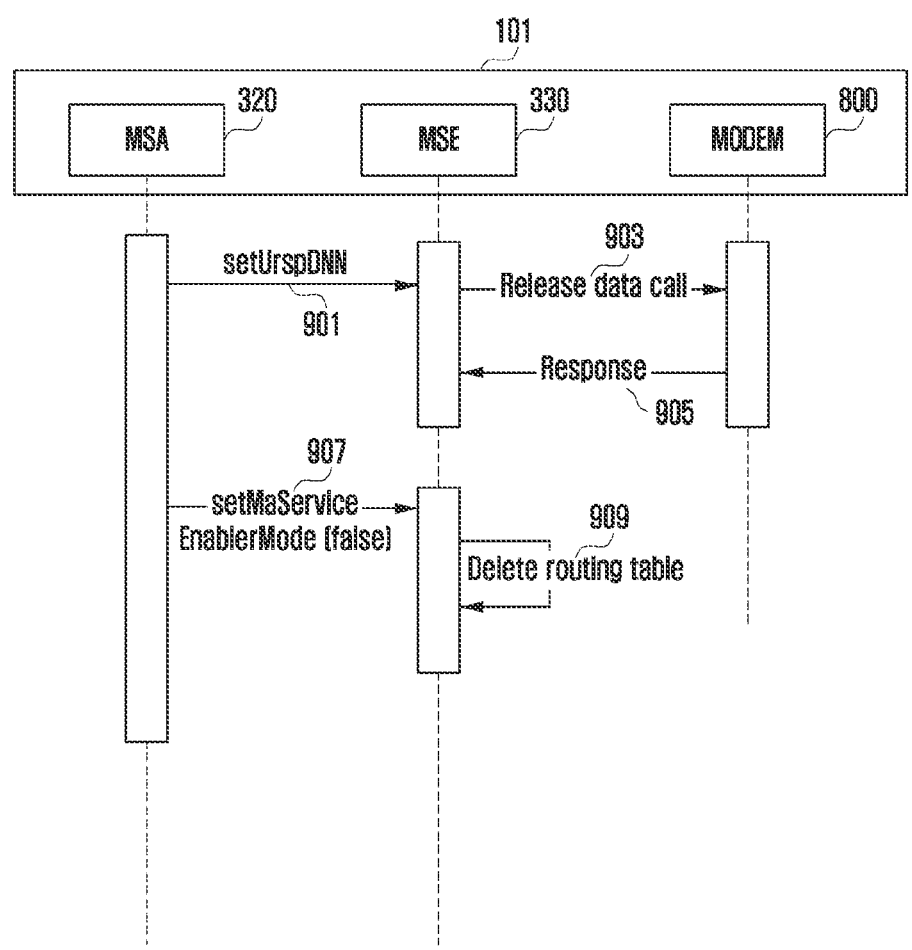
FIG. 9 illustrates an example of a PDU session setup operation by the electronic device 101 according to various embodiments of the disclosure.

FIG. 9 illustrates an example of a PDU session setup operation by the electronic device 101 according to various embodiments of the disclosure.

As illustrated in FIG. 9, FIG. 9 illustrates an example of PDU session release during policy update (for example, PDU session setup) and an example of an operation for releasing the PDU session (or PDN connection). According to an embodiment, the PDU session setup may include new PDU session establishment, existing PDU session release, and existing PDU session update (for example, a change in configuration for a characteristic for each PDU session (for example, QoS information such as a bandwidth or latency)), and FIG. 8 illustrates an example of PDU session release. According to an embodiment, the electronic device 101 may include the MSA (or service agent) 320, the MSE (or service enabler) 330, and a modem (or a Communication Processor (CP)) 800.

Referring to FIG. 9, when the MSA 320 should release the configuration of information on the DNN setup, the MSA 320 may provide (or transmit) a first message (for example, setUrspDNN) indicating release of the corresponding DNN to the MSE 330 in operation 901.

In operation 903, the MSE 330 may provide a second message (for example, Release data call) indicating release of a data call to a modem 1300 on the basis of the first message (for example, setUrspDNN) provided from the MSA 320.

When receiving a third message (for example, Release data call) from the MSE 330 in operation 905, the modem 800 may release the configuration set to process the corresponding service (for example, MEC service) and provide a fourth message (for example, response message) corresponding to the third message to the MSE 330. According to an embodiment, the PDU session may be released on the basis of a request made by the modem 800 to release the PDU session to a core network (for example, SMF).

In operation 907, the MSA 320 may provide a fifth message (for example, setMaServiceEnableMode(false)) indicating execution (false) of an MEC service deactivation mode (for example, MSE deactivation) to the MSE 330.

In operation 909, the MSE 330 may delete a routing table stored in (or generated by) a memory (for example, the memory 130 of FIG. 1 or 2) from the memory on the basis of the fifth message (for example, setMaServiceEnableMode (false)) received from the MSA 320.

Figure 10:
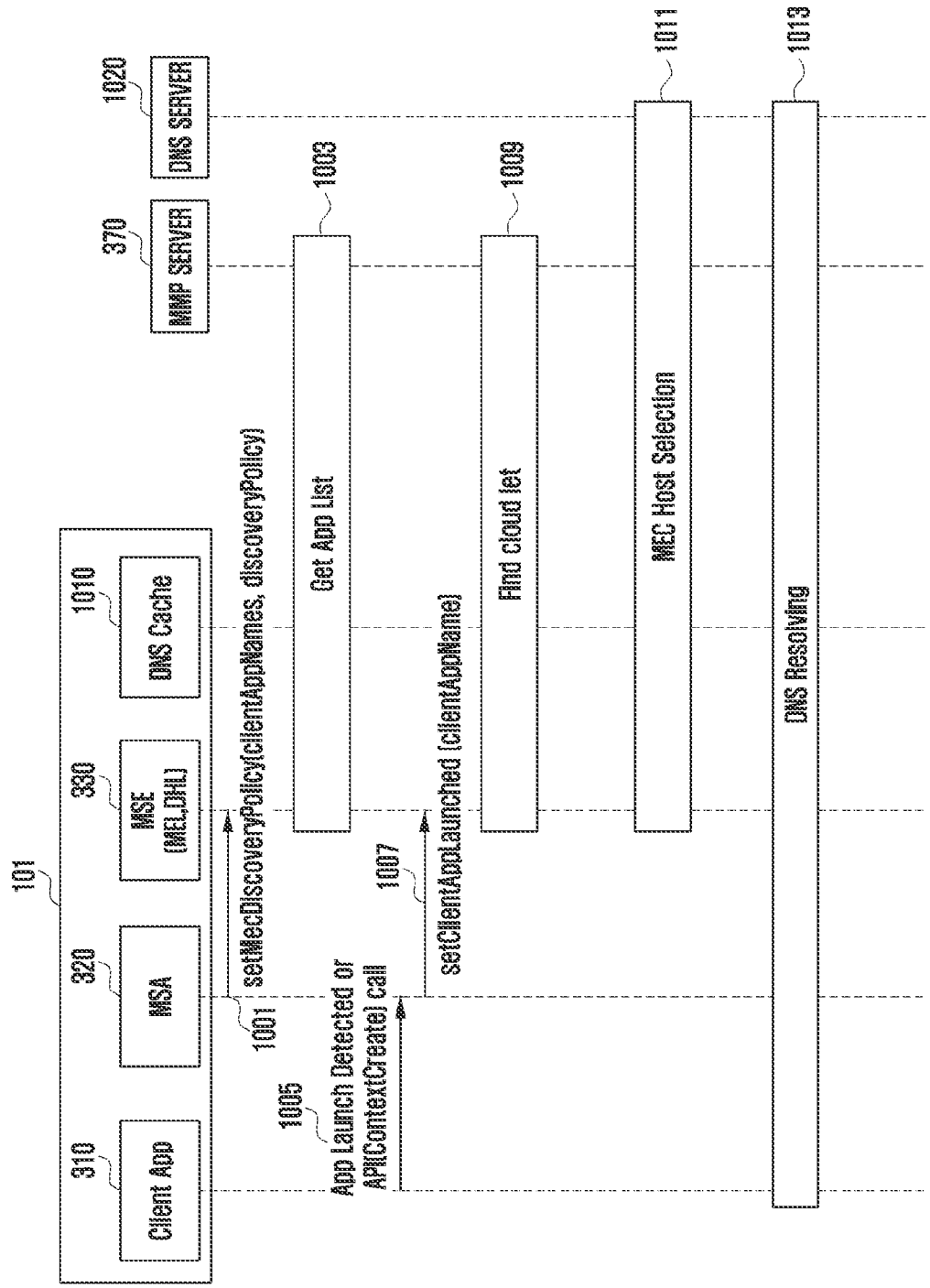
FIG. 10 illustrates an example of a discovery procedure according to various embodiments of the disclosure.

FIG. 10 illustrates an example of a discovery procedure according to various embodiments of the disclosure.

As illustrated in FIG. 10, FIG. 10 illustrates an example an application state-based (App state-based) MEC discovery procedure. According to an embodiment, the electronic device 101 may include the client application (or client App) 310, the MSA (or service agent) 320, the MSE (or service enabler) 330 (for example, including the MEL 331 and the UHL 333), and a DNS cache 1010.

Referring to FIG. 10, in operation 1001, the MSA 320 of the electronic device 101 may configure an MEC discovery policy in the MSE 330. According to an embodiment, the MEC discovery policy may include and provide a client application name (for example, clientAppNames) and a discovery policy (for example, discoveryPolicy). According to an embodiment, discoveryPolicy may include information indicating whether a dynamic DNN (for example, dynamicDnn) is used, and may include and provide at least one piece of information such as a location (for example, locationInfo), a device type (for example, deviceType), a service type (for example, serviceType), or a context type (for example, contextType). According to an embodiment, the MSA 320 may insert the location (for example, locationInfo), the device type (for example, deviceType), and the service type (for example, serviceType) into discoveryPolicy and restrictively receive only an app list that meets the corresponding condition. According to an embodiment, the MSA 320 may insert the context type (for example, contextType) into discovery Policy to include information indicating whether application context is needed. According to an embodiment, when the MSA 320 inserts a URI Request Flag into discoveryPolicy and a URI of the MEC application is available, the MSA 320 may make a request for inserting the URI into the app list. According to an embodiment, the client application name (clientAppNames) may be information for making a request for the app list to identify whether MEC is available, the location (locationInfo) may be information for making a request for a location-based app list according to the current location of the electronic device 101, and the dynamic DNN (dynamicDnn) may be information for making a request for identifying the use of dynamic DNN update.

In operation 1003, the MSE 330 may perform an acquisition procedure (for example, MEC Application Look-up) for acquiring an app list (for example, AppList) on the basis of the information (for example, MEC discovery policy) received from the MSA 320. According to an embodiment, the acquisition procedure (for example, MEC Application Look-up) for acquiring the app list may start according to the configuration of the MEC discovery policy between the MSA 320 and the MSE 330. According to an embodiment, when receiving the MEC discovery policy from the MSA 320 through the MSE API, the MSE 330 may activate MEC Application Look-up and perform (or start) the same when a specific condition of the electronic device 101 (for example, a change in a Cell ID of an accessed base station while the electronic device 101 moves) is satisfied. According to an embodiment, the MSE 330 may make a request for an app list (for example, MEC AppList) related to an MEC application (for example, MEP App) which can be serviced according to the MEC discovery policy and receive the same. According to an embodiment, the MSE 330 may write the MEC discovery policy in an MEC AppList request message Parameter as shown in <Table 1> and transmit a request to the MMP server 370, and the MMP server 370 may provide an app list which can be serviced suitable therefor to the MSE 330 and respond to the request from the MSE 330.

In operation 1005, the client application 310 may provide (or transmit) an App Launch Detected or API (Context Create) call to the MSA 320. According to an embodiment, the case of App Launch Detected may indicate the case in which the client application 310 is executed. According to an embodiment, the API (Context Create) call may indicate the case of making a request for a URI for an MEC application name (for example, MEC App Name) to be accessed.

When receiving the App Launch Detected or API (Context Create) call, the MSA 320 may provide a notification message (for example, notifyClientAppState) notifying of a state of the client application 310 to the MSE 330 in operation 1007. According to an embodiment, the notification message (for example, notifyClientAppState) may include and provide, for example, the state (for example, START) of the client application and the client application name (for example, clientAppName) (and/or UID) (for example, notifyClientAppState (START, clientAppName)).

In operation 1009, the MSE 330 may receive the notification message (for example, notifyClientAppState) from the MSA 320 and perform a procedure (for example, application context create) for discovering (or searching for or identifying) an MEC application (or an MEC host (for example, an edge server or an MEC server) including the corresponding MEC application) on the basis of the received notification message. According to an embodiment, when receiving an event related to execution of the client application 310 from the MSA 320, the MSE 330 may activate application context create. According to an embodiment, the MSE 330 may perform an operation of application context create for discovering the MEC host including a desired MEC application through the MMP server 370 on the basis of information of the received notification message (for example, notifyClientAppState). According to an embodiment, the application context create may be activated (or performed) by an MSE API call when the MSA 320 detects execution of the client application 310. According to an embodiment, the application context create may be activated (or performed) when the client application 310 calls a context create API. According to an embodiment, the MSE 330 may make a request for a URI for the MEC application name (for example, MEC App Name) to be accessed to the MMP server 370 and receive the same. According to an embodiment, the MSE 330 may make a request for information on a dedicated DNN to the MMP server 370 as necessary and receive the same. According to an embodiment, when there is no corresponding MEC application, the MMP server 370 may transmit an MEC application package URI to the MSE 330. The application context create procedure according to various embodiments is described in detail with reference to the following drawings.

In operation 1011, the MSE 330 may perform a host selection procedure (for example, MEC Host Selection) for selecting an MMC host with a DNS server 1020. According to an embodiment, when the number of MEC hosts acquired through the MMP server 370 is two or more, the MSE 330 may perform a host selection procedure (for example, MEC Host Selection) for selecting one MEC host with the DNS server 1020. According to an embodiment, when the number of MEC hosts is two or more, the host selection procedure for selecting one MEC host may be determined using pre-configured information and/or information asked to the DNS server 1020, and/or may select (or configure) a specific MEC host on the basis of information asked to the DNS server 1020 and/or by inquiring the user. According to an embodiment, when the number of MEC hosts is two or more, information pre-configured by the MSE 330 to configure a specific MEC host may include the MSE 330 may include priority information. According to an embodiment, the host selection procedure may include a DNS Pre-resolving operation and an MEC Host Prioritization operation. According to an embodiment, DNS Pre-resolving may include, for example, the performance of DNS resolving for MEC Fully Qualified Domain Name (FQDN) by the MSE 3330 itself regardless of a DNS query of the client application 310. According to an embodiment, DNS resolving may be performed using the URI or the domain name received through a Get App List step in operation 1003 or a Find Cloudlet step in operation 1009. According to an embodiment, for example, when a plurality of IP addresses are received as a DNS query response, MEC Host Prioritization may include configuration of IP priorities. The host selection procedure (for example, MEC Host Selection) according to various embodiments is described in detail with reference to the following drawings.

In operation 1013, the client application 310 may perform the DNS resolving operation on the basis of information acquired through the operation. According to an embodiment, DNS resolving may be performed, for example, when the DNS query of the client application 310 is generated. According to an embodiment, DNS resolving may include, for example, Client-driven normal DNS resolving or DNS proxying (hooking DNS query). DNS resolving according to various embodiments is described in detail with reference to the following drawings.

Figure 11:
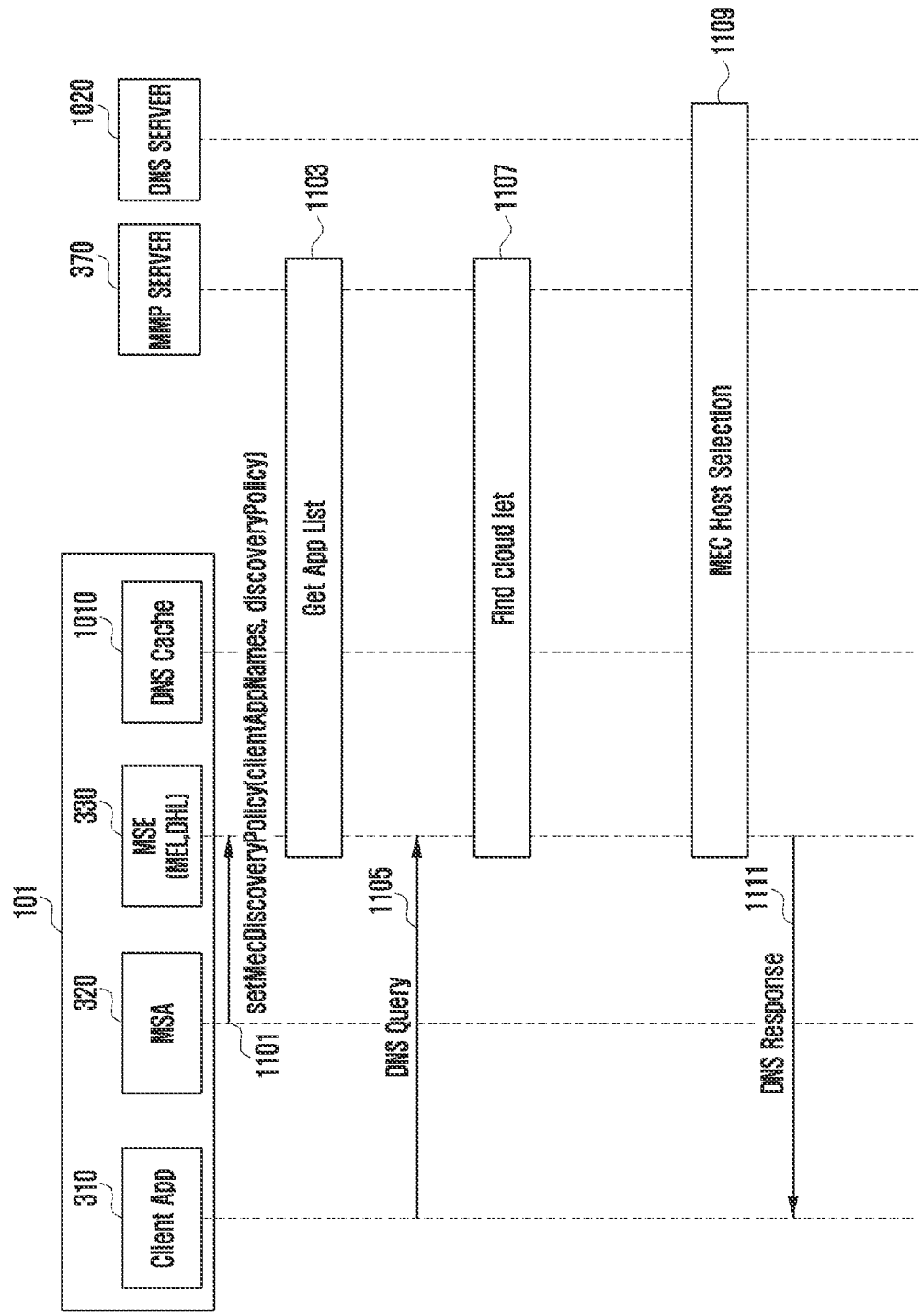
FIG. 11 illustrates an example of a discovery procedure according to various embodiments of the disclosure.

FIG. 11 illustrates an example of a discovery procedure according to various embodiments of the disclosure.

As illustrated in FIG. 11, FIG. 11 illustrates an example of a DNS Query-based MEC discovery procedure. According to an embodiment, the electronic device 101 may include the client application (or client App) 310, the MSA (or service agent) 320, the MSE (or service enabler) 330 (for example, including the MEL 331 and the UHL 333), and a DNS cache 1010.

Referring to FIG. 11, in operation 1101, the MSA 320 of the electronic device 101 may configure an MEC discovery policy in the MSE 330. According to an embodiment, the MEC discovery policy may include and provide a client application name (for example, clientAppNames) and a discovery policy (for example, discoveryPolicy). According to an embodiment, discoveryPolicy may include information indicating whether a dynamic DNN (for example, dynamicDnn) is used, and may include and provide at least one piece of information such as a location (for example, locationInfo), a device type (for example, deviceType), a service type (for example, serviceType), or a context type (for example, contextType). According to an embodiment, the MSA 320 may insert the location (for example, locationInfo), the device type (for example, deviceType), and the service type (for example, serviceType) into discoveryPolicy and restrictively receive only an app list that meets the corresponding condition. According to an embodiment, the MSA 320 may insert the context type (for example, contextType) into discoveryPolicy to include information indicating whether application context is needed. According to an embodiment, when the MSA 320 inserts a URI Request Flag into discoveryPolicy and a URI of the MEC application is available, the MSA 320 may make a request for inserting the URI into the app list.

In operation 1103, the MSE 330 may perform an acquisition procedure (for example, MEC Application Look-up, Get App List) for acquiring an app list (for example, AppList) on the basis of the information (for example, MEC discovery policy) received from the MSA 320. According to an embodiment, the acquisition procedure (for example, MEC Application Look-up, Get App List) for acquiring the app list may start according to the configuration of the MEC discovery policy between the MSA 320 and the MSE 330. According to an embodiment, when receiving the MEC discovery policy from the MSA 320 through the MSE API, the MSE 330 may activate MEC Application Look-up and perform (or start) the same when a specific condition of the electronic device 101 (for example, a change in a Cell ID of an accessed base station while the electronic device 101 moves) is satisfied. According to an embodiment, the MSE 330 may make a request for an app list (for example, MEC AppList) related to an MEC application (for example, MEP App) which can be serviced according to the MEC discovery policy to the MMP server 370 and receive the same. According to an embodiment, the MSE 330 may write the MEC discovery policy in an MEC AppList request message Parameter and transmit a request to the MMP server 370, and the MMP server 370 may provide a service app list suitable therefor to the MSE 330 and respond to the request from the MSE 330.

In operation 1105, the client application 310 may transfer a message for a DNS query (for example, a DNS query message) to the MSE 330.

In operation 1107, the MSE 330 may perform a Find Cloudlet operation with the MMP server 370 in response to the DNS query from the client application 310. According to an embodiment, when the DNS query (with FQDN) message is generated by the client application 310, the MSE 330 may perform Find Cloudlet for the corresponding MEC application (for example, MEC App) when the FQDN for MEC is detected through FQDN filtering. According to an embodiment, the MSE 330 may make a request for a URI for the MEC application name (for example, MEC App Name) to be accessed to the MMP server 370. According to an embodiment, the MSE 330 may make a request for information on a dedicated DNN to the MMP server 370 as necessary and receive the same. According to an embodiment, when there is no corresponding MEC application, the MMP server 370 may transmit an MEC application package URI to the MSE 330.

In operation 1109, the MSE 330 may perform a host selection procedure (for example, MEC Host Selection) for selecting an MEC host with the DNS server 1020 in response to the DNS query from the client application 310. According to an embodiment, when the number of MEC hosts acquired through the MMP server 370 is two or more, the MSE 330 may perform a host selection procedure (for example, MEC Host Selection) for selecting one MEC host with the DNS server 1020. According to an embodiment, when the number of MEC hosts is two or more, the host selection procedure for selecting one MEC host may be determined using preconfigured information and/or information (for example, an IP address and location information for each IP) received through a request to the DNS server 1020 or may allow the user to select (or configure) a specific MEC host through the information received in response to the request to the DNS server 1020 or a User Interface (UI) (for example, a selection button). According to an embodiment, when the number of MEC hosts is two or more, information pre-configured by the MSE 330 to configure a specific MEC host may include priority information. According to an embodiment, the priority information may include, for example, information on host priorities determined according to each URI or, when the number of IP addresses that are the results of DNS resolving for one URI is plural, information on priorities for each corresponding IP address. According to an embodiment, the host selection procedure may include a DNS resolving operation and an MEC Host Prioritization operation. According to an embodiment, DNS resolving may include, for example, the performance of DNS resolving for the FQDN for MEC by the MSE 330 itself regardless of a DNS query of the client application 310. According to an embodiment, for example, when a plurality of IP addresses are received as a DNS query response, MEC Host Prioritization may include configuration of IP priorities. According to an embodiment, the priority may be predetermined for each URI or each IP, and when a plurality of IP addresses are received, the IP priority may be determined according to the result of a performance test for each of a plurality of IPs. The host selection procedure (for example, MEC Host Selection) according to various embodiments is described in detail with reference to the following drawings.

When the procedures are completed, the MSE 330 may provide information acquired through the procedures to the client application 310 as a DNS response in operation 1111. According to an embodiment, after MEC host selection (for example, DNS resolving), the MSE 330 may transmit a DNS response corresponding to the DNS query to the client application 310 providing the DNS query. The DNS response according to various embodiments is described with reference to the following drawings.

Figure 12:
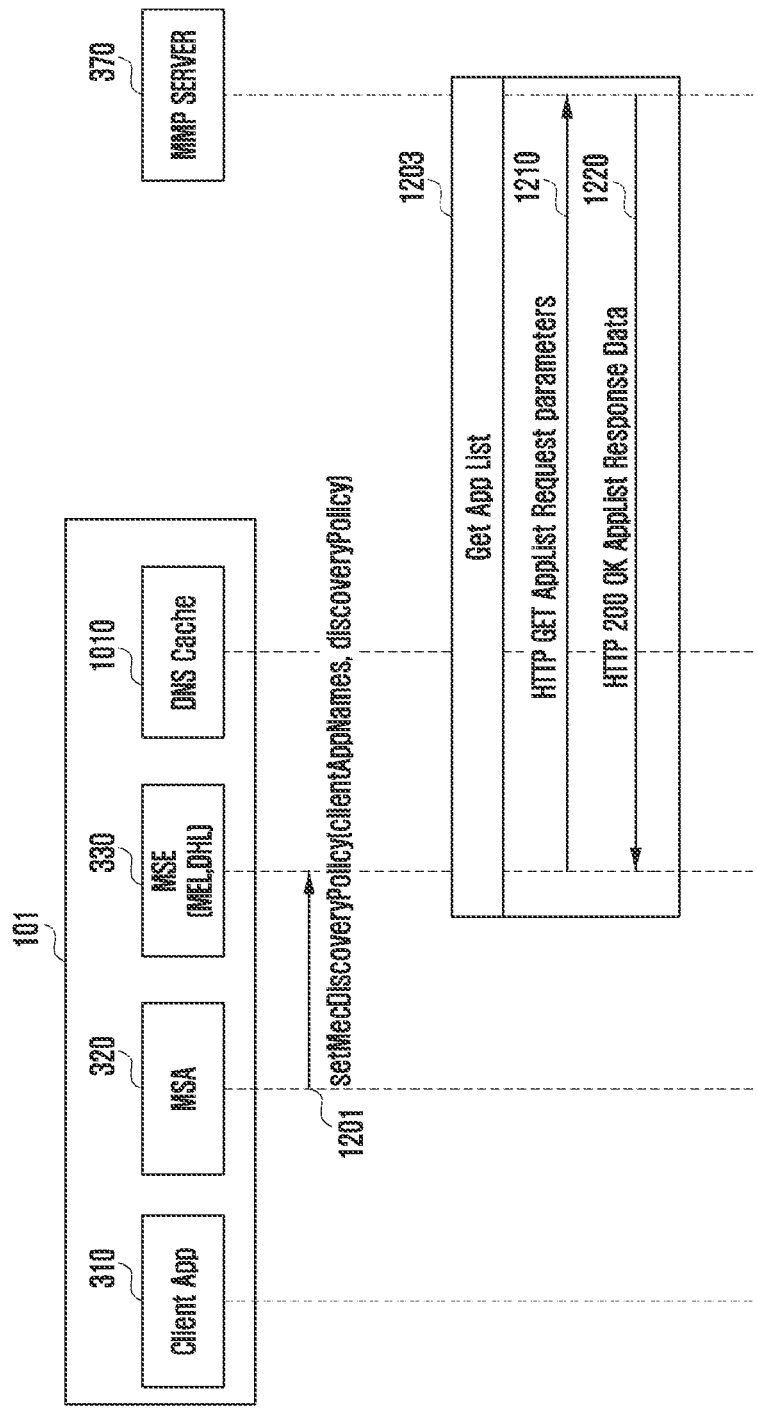
FIG. 12 illustrates an example of an operation of acquiring an app list in a discovery procedure according to various embodiments of the disclosure.

FIG. 12 illustrates an example of an operation of acquiring an app list in a discovery procedure according to various embodiments of the disclosure.

As illustrated in FIG. 12, FIG. 12 illustrates an example of an operation related to the generation or acquisition of the app list (for example, MEC Application Look-up) in the MEC discovery procedure according to an embodiment.

Referring to FIG. 12, in operation 1201, the MSA 320 of the electronic device 101 may transmit an MEC discovery policy to the MSE 330. According to an embodiment, the MEC service module 410 may acquire the MEC discovery policy through the MSA 320 and perform a discovery procedure based on the MEC discovery policy received using the MSE 330. According to an embodiment, the MEC discovery policy may include and provide at least one piece of information such as a client application name (for example, clientAppNames), a location (for example, locationInfo), a device type (for example, deviceType), a service type (for example, serviceType), a context type (for example, contextType), a URI request flag (for example, URI Request), or a dynamic DNN (for example, dynamicDnn).

In operation 1203, the MSE 330 may perform an acquisition procedure (for example, MEC Application Look-up) for acquiring an app list (for example, AppList) on the basis of the information (for example, MEC discovery policy) received from the MSA 320. According to an embodiment, the operation acquiring the app list may be started according to the configuration of the MEC discovery policy between the MSA 320 and the MSE 330. According to an embodiment, the procedure of acquiring the app list may be activated when the MSA 320 calls an MEC discovery policy API, make a request for an MEC app list and/or a URI suitable for the MEC discovery policy to the MMP server 370, and receive the same. According to an embodiment, the procedure of acquiring the app list may include operation 1210 and operation 1220.

In operation 1210, the MSE 330 may transmit a request message (for example, HTTP Get AppList Request Parameters) making a request for the app list to the MMP server 370. According to an embodiment, the MSE 330 may insert (or write) the MEC discovery policy into the request message (for example, HTTP Get AppList Request Parameters) and provide the request message to the MMP server 370. For example, the MSE 330 may include and provide the app list request parameter to the MMP server 370.

According to an embodiment, field information that can be supported in the request parameter may be defined in MMP Info within an Authorization Response in the authentication (AA) step. According to an embodiment, parameters (or information) (for example, AppList Request Parameters)

related to the app list request may be included in a parameter field of a request message (for example, HTTP GET). According to an embodiment, the app list request parameters may include at least one of the application name (for example, clientAppNames) received from the MSA 320 (for example, setMecDiscoveryPolicy (clientAppNames and discoveryPolicy) in operation 1201), an access Cell ID, a Tracking Area (TA) ID, a region information (for example, Si, Gu, Dong, and building), location information (Location Info) related to the location of the electronic device 101 including at least one piece of preferred location information designated by the user, a device type (for example, Smartphone, Tablet, Wearable, IoT, Car, or Drone) for identifying the type of the electronic device 101, a service type (for example, Game, V2X, AR/VR, LBO, Enterprise, or Web) for identifying the type of the service, a context type (for example, whether context information of a user or an application is required for executing the MEC application) for identifying whether context information is required, or, when a URI of the MEC application is available, a flag (for example, URI Request Flag) making a request for inserting the corresponding URI into a response. According to an embodiment, the context type is information for identifying a service application type of the electronic device 101 and may include, for example, at least one of an application (for example, a specific launcher or a predetermined application) installed in the electronic device 101, a name of an executed application, and a domain.

According to an embodiment, the electronic device 101 may transfer information on the application (for example, specific launcher or predetermined application) installed in the electronic device 101 to the MMP server 370 in a procedure of making a request for the app list. According to an embodiment, when there is a change (for example, update) in information on the application installed in the electronic device 101, the electronic device 101 may transmit the information on the application installed in the electronic device 101 in the procedure of making a request for the app list to the MMP server 370.

In operation 1220, the MMP server 370 may provide a response message (for example, HTTP 200 OK AppList response Data) including the app list (for example, MEC AppList) to the MSE 330 in response to the request message received from the MSE 330. According to an embodiment, the MMP server 370 may search for an MEC application on the basis of the received client application name, and may provide an app list including the searched MEC application in a response message to the MSE 330.

According to an embodiment, data (or information) related to the app list response (for example, AppList Response Data) may be included in a message body of the response message (for example, HTTP 200 OK).

According to an embodiment, when providing the app list, the MMP server 370 may provide all of the available MEC App Lists or an MEC App List which can be serviced on the basis of at least one of Request Parameters. According to an embodiment, an MEC App Name which can be accessed for each client application (Client App) may be included, and the MEC App Name may be used (or required) for an Application Context Create operation thereafter.

According to an embodiment, when an operator's location API is available, the MMP server 370 may insert a notification into the app list provided the app list. According to an embodiment, when the URI Request Flag is true in the request message and the corresponding MEC App is being executed in an available MEC host near the electronic device 101 (for example, user equipment), the MMP server 370 may insert a URI of the corresponding MEC App into the app list and provide the app list. According to an embodiment, even when there is no URI request flag in the request message, the MMP server 370 may insert the URI of the corresponding MEC App into the app list and provide the app list if the corresponding MEC App is being executed in the MEC host. According to an embodiment, when receiving an app list request from the electronic device 101, the MMP server 370 may execute the MEC App and then insert the corresponding URI into the request message and provide the request message if the MEC App can be directly executed according to the context type. According to an embodiment, the MMP server 370 may further insert effective time/effective place information of the URI into the app list and provide the app list. According to an embodiment, the information on the effective time of the URI may be determined by the electronic device 101 or variably determined by the MMP server 370 according to an MME App execution state. According to an embodiment, when there is an application-dedicated DNN rule, the MMP server 370 may provide the corresponding rule.

According to an embodiment, the URI included in the app list may be distinguished by hyperlink or highlight, and the electronic device 101 may distinguish and display the URI from the MEC App which does not include the URI on the basis of hyperlink and/or highlight. According to another embodiment, the electronic device 101 may equally display the MEC App which includes the URI and the MEC App which does not include the URI in the app list without any distinction therebetween. According to an embodiment, the electronic device 101 may include and provide location and/and time information which can be serviced for each application in the app list.

According to an embodiment, when the DNN setup is possible in units of applications in a procedure of transmitting a response of the app list, the MMP server 370 may include used DNN information for each application (or each app) in the app list. According to an embodiment, the corresponding DNN server may be a DNN included in a DNN list received during the authentication (AA) procedure.

According to an embodiment, the electronic device 101 may make a request for the app list to the MMP server 370 and acquire (or receive) the app list and information (for example, URI) on an MEC host (for example, an edge server or an MEC server) for corresponding application(s) of the app list during the procedure of receiving a response thereto. According to an embodiment, when information (for example, URI) on the MEC host is not received, the electronic device 101 may further perform, for example, the Application Context Create procedure for the corresponding app and acquire information (for example, URI) on the MEC host for the corresponding application from an external server. According to an embodiment, when the electronic device 101 receives information on the MEC host (for example, URI), the electronic device may directly access, for example, the corresponding MEC host (for example, through the URI) without performing any Application Context Create procedure for the corresponding application.

According to an embodiment, the electronic device 101 may make a request for the app list to the MMP server 370 and receive the app list and information on a predetermined networking path (for example, DNN) for corresponding application(s) of the app list in a procedure of make a request for the app list to the MMP server 370 and receiving a response thereto. According to an embodiment, when the electronic device 101 receives information on the predetermined networking path (for example, DNN), the electronic device may perform a procedure of configuring a network and a predetermined networking path. According to an embodiment, the electronic device 101 may configure a DNN path to communication with a predetermined (or dedicated (DNN) only for applications receiving DNN information. According to an embodiment, the electronic device 101 may configure a predetermined DNN path for applications receiving DNN information in a procedure of making a request for creating MEC host context (for example, Application Context Create).

Figure 13:
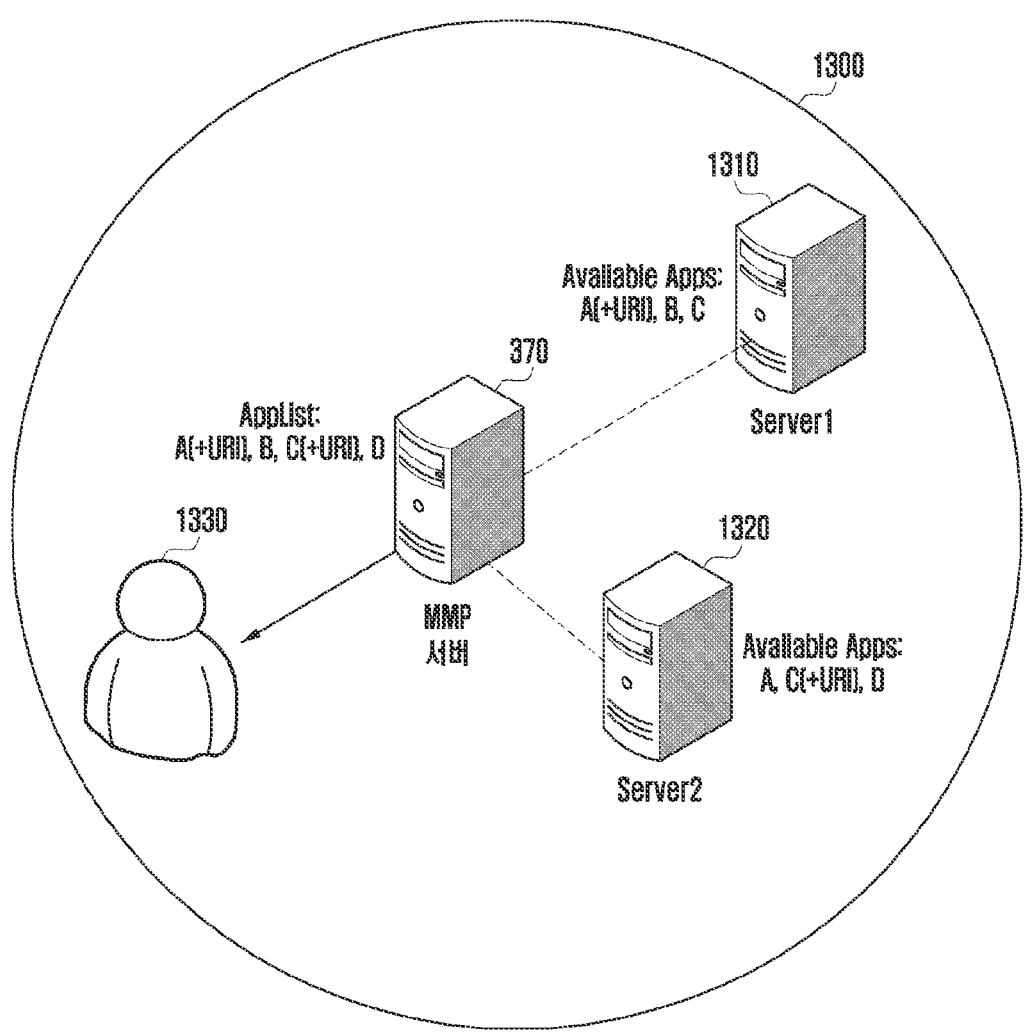
FIG. 13 illustrates an example of providing an app list according to various embodiments of the disclosure.

FIG. 13 illustrates an example of providing an app list according to various embodiments of the disclosure.

As illustrated in FIG. 13, FIG. 13 illustrates a location-based service area.

Referring to FIG. 13, according to an embodiment, it may be assumed that the MMP server 370 acquires first information (for example, A(+URI), B, and C) on available applications (Available Apps) from a first server (Server 1) 1310 (or a first MEC host adjacent to the user). According to an embodiment, it may be assumed that the MMP server 370 acquires second information (for example, A, C(+URI), and D) on available applications from a second server (Sever 2) 1320 (or a second MEC host adjacent to the user).

According to an embodiment, the MMP server 370 may collect information (for example, the first information and the second information) on the applications acquired from the first server 1310 and the second server 1320 and generate (or acquire) the information A(+URI), B, C(+URI), and D. According to an embodiment, the MMP server 370 may generate an app list including A(+URI), B, C(+URI), and D generated by the first server 1310 and the second server 1320 and provide the generated app list to a user 1330 (for example, the electronic device 101).

Figure 14:
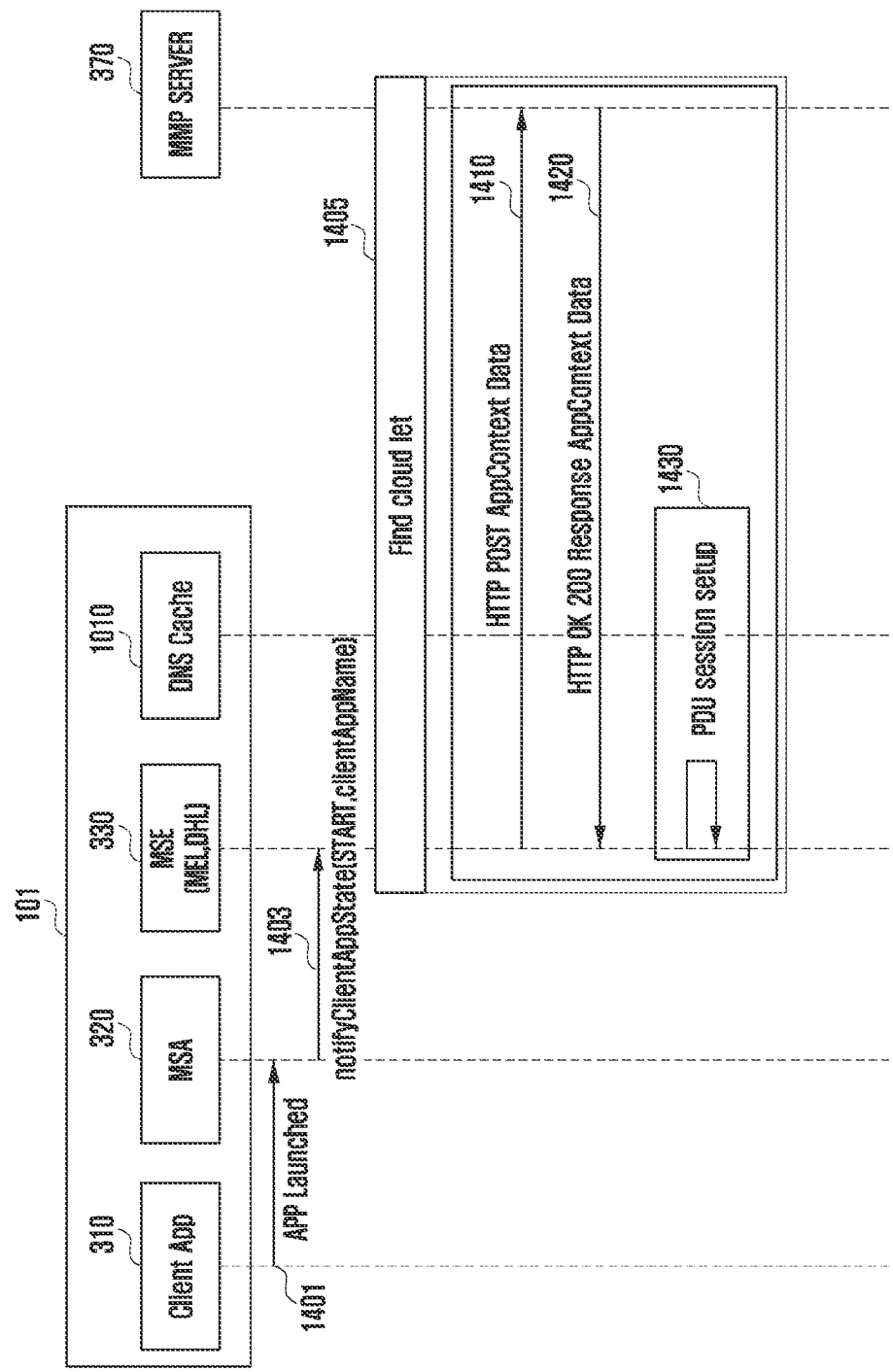
FIG. 14 is a diagram illustrating an example of a context creation procedure in a discovery procedure according to various embodiments.

FIG. 14 illustrates an example of a context creation procedure in a discovery procedure according to various embodiments.

As illustrated in FIG. 14, FIG. 14 illustrates an example of an operation related to application context creation (for example, Application Context Create) in the MEC discovery procedure according to an embodiment. According to an embodiment, the procedure of creating the application context may be performed, for example, from transmission of application start information to the MSE 330 through the MSE API along with information related to the corresponding client application (for example, a package name or a UID) by the MSA 320 when the client application 310 is executed. According to various embodiments, the application context creation may be performed when an application in the app list is launched (first case), the application makes a request for creating context (contextcreate) through the MSE API (for example, call a context create API) (second case), or, when a DNS query is transmitted in the application, the DNS query matches a name and/or a URI (for example, FQDN) of an application included in the pre-received app list (third case). According to an embodiment, the application context creation may be performed when, for example, location information transmitted through an MEC discovery policy (for example, setDiscoveryPolicy(discoveryPolicy)) or an available location for each application (for example, uriLOC) included in the app list transmitted through an application look-up response matches the location of the current user (or the electronic device 101) (for example, fourth case). According to various embodiments, when at least one of the first case, the second case, the third case, or the fourth case is satisfied, the application context creation may be performed. FIG. 14 may show an example of an operation of performing the application context creation according to the first case.

Referring to FIG. 14, in operation 1401, when the specific client application 310 is launched, the corresponding client application 310 may provide information (for example, App Launched) informing of the launch of the application to the MSA 320. According to an embodiment, operation 1401 may not be performed. For example, when the client application 310 is launched, the MSA 320 (for example, Framework level) may detect the launch of the client application 310 by itself without any operation of informing of the launch by the client application 310.

When the MSA 320 receives information (For example, App Launched) informing the launch of the client application 310, the MSA 320 may provide a notification message (for example, notifyClientAppState) notifying of a state of the client application 310 to the MSE 330 in operation 1403. According to an embodiment, the notification message (for example, notifyClientAppState) may include and provide, for example, the state (for example, START) of the client application and the client application name (for example, clientAppName) (and/or UID) (for example, notifyClientAppState (START, clientAppName)).

In operation 1405, the MSE 330 may receive the notification message (for example, notifyClientAppState) from the MSA 320 and perform an application context creation procedure on the basis of information in the received notification message. According to an embodiment, the application context creation procedure (operation 1405) may include operation 1410, operation 1420, and operation 1430.

In operation 1410, the MSE 330 may transmit a request message (for example, HTTP POST AppContext Data) making a request for application context creation to the MMP server 370. According to an embodiment, when MEC application context creation is needed (for example, when there is no URI in the app list), the MSE 330 may transmit a request message making a request for a URI to the MMP server 370. According to an embodiment, w % ben there is the MEC application in the MMP server 370, the MSE 330 may insert an MEC application name (MEC App Name) into the request message and transmit the request message to the MMP server 370. According to another embodiment, when there is not MEC application in the MMP server 370, the MSE 330 may insert only a URI (for example, application package download URI) by which the corresponding MEC application can be downloaded into the request message and transmit the request message to the MMP server 370.

In operation 1420, the MMP server 370 may provide a response message (for example, HTTP OK 200 Response AppContext Data) including the URI of the MEC application to the MSE 330 in response to the request message received from the MSE 330. According to an embodiment, the response message may include the URI (FQDN) of the application (for example, MEC application) corresponding to the response message. According to an embodiment, the response message may include the URI of the MEC application and information on an effective time and/or effective location of the corresponding URI. According to an embodiment, when the effective time passes or the effective location changes, the MSE 330 may re-perform application context or perform handover triggering. According to an embodiment, the response message may include DNN information.

In operation 1430, the MSE 330 may perform policy update. According to an embodiment, the MSE 330 may additionally (or selectively) include a policy update operation in the application context creation procedure (operation 1405). According to an embodiment, when a dedicated PDU session is needed (or when a new dedicated DNN rule is configured), the MSE 330 may receive URSP rules (for example, DNN) and establish a PDU session for each application or each URI according to the URSP rules. For example, the URSP rules (or CARP rules) may be received as the result of the authentication procedure (for example, received by the MSA 320 and transmitted to the MSE 330), the result of the application lookup (for example, App lookup) by the MSE 330, or the result of context creation (Context Create), and when a new DNN rule is configured in the URSP rules, PDU session setup may be performed. According to an embodiment, when the MSE 330 makes a request for the PDU session setup (for example, the PDU session establishment in FIG. 8 and the PDU session release in FIG. 9) to the modem 800 as illustrated in the part described with reference to FIG. 8 or FIG. 9, the PDU session setup may be established/released through a request to an SMF of a 5G network (or core network) by the modem 800.

According to an embodiment, the application context creation procedure (operation 1405) may be omitted when, for example, the MEC application which the client application 310 should access is already being executed and a URI is received in an app list acquisition procedure (for example, MEC Application Look-up).

Figure 15:
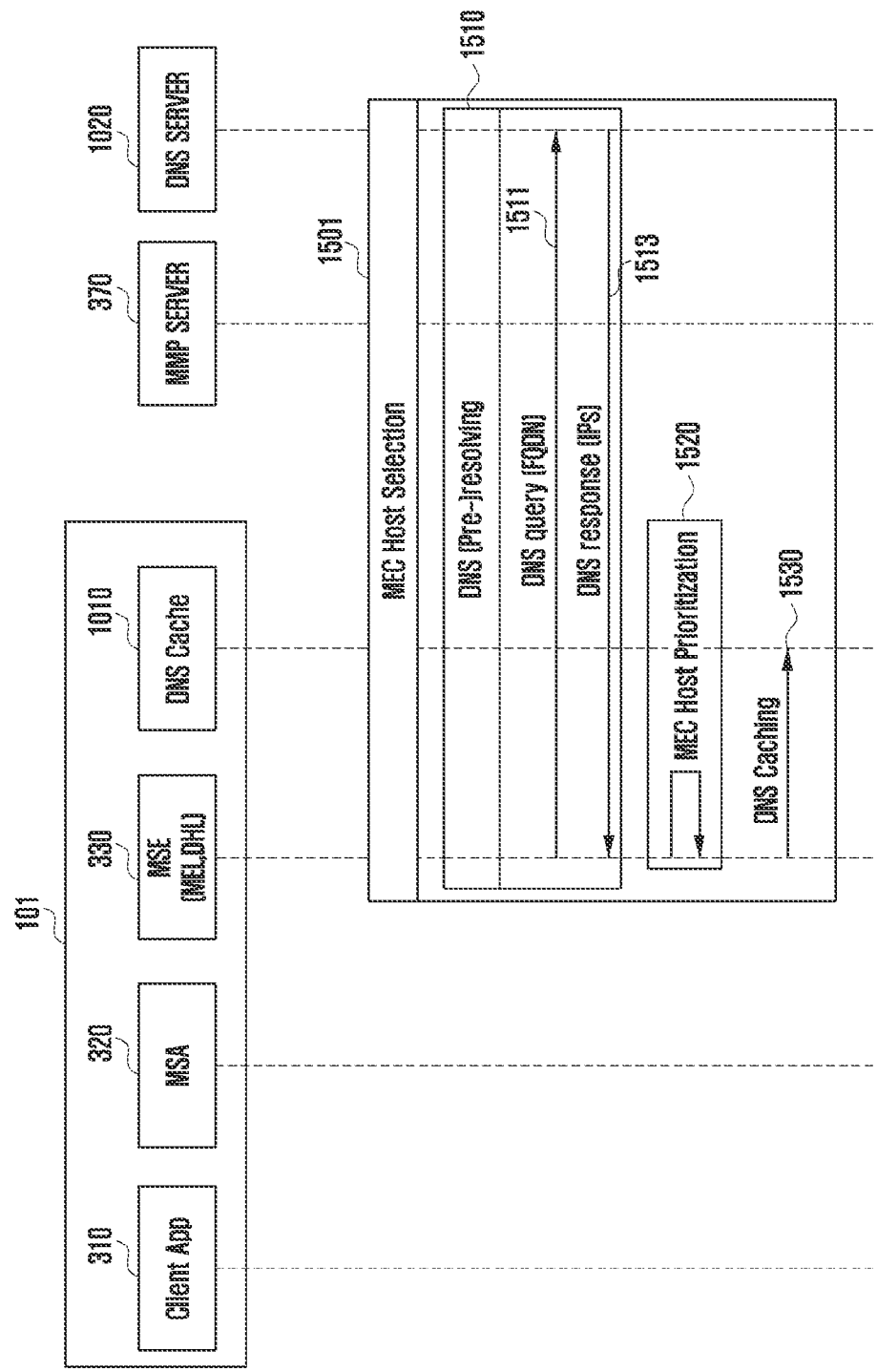
FIG. 15 illustrates an example of an MEC host selection procedure in the discovery procedure according to various embodiments of the disclosure.

FIG. 15 illustrates an example of an MEC host selection procedure in the discovery procedure according to various embodiments of the disclosure.

As illustrated in FIG. 15, FIG. 15 illustrates an MEC host selection operation (MEC Host selection) 1501 in which the MSE 330 selects an MEC host with the DNS server 1020. According to an embodiment, the MEC host selection operation (operation 1501) may include a DNS (pre) resolving operation (for example, operation 1510), an MEC Host Prioritization operation (for example, operation 1520), and a DNS caching operation (for example, operation 1530).

Referring to FIG. 15, in operation 1510, the MSE 330 may perform DNS resolving (or pre-resolving). According to an embodiment. DNS resolving may include, for example, the performance of DNS resolving for the FQDN for MEC by the MSE 3330 itself regardless of a DNS query of the client application 310. According to an embodiment, the DNS resolving (operation 1510) may include operation 1511 and operation 1513.

According to an embodiment, in operation 1511, the MSE 330 may perform the DNS resolving operation by the DHL 335. According to an embodiment, the MSE 330 may transmit a DNS query to the URI (FQDN) for the MEC application to the DNS server 1020.

According to an embodiment, in operation 1513, the DNS server 1020 may receive the DNS query from the MSE 330 and transmit a DNS response to the MSE 330 in response to the DNS query. According to an embodiment, the DNS response may include at least one piece of address information (for example, URI or IP address) related to the MEC host.

In operation 1520, the MSE 330 may perform an MEC host prioritization operation. According to an embodiment, for example, when a plurality of IP addresses are received as a DNS query response, MEC Host Prioritization may include configuration of IP priorities (prioritization). For example, the MSE 330 may configure the priority for the MEC host.

According to an embodiment, the MSE 330 may acquire (or receive) a candidate IP list for a plurality of MEC hosts from the MMP server 370 and select an access IP from among an MEC host candidate IP and a remote server (for example, the remote server 306 of FIG. 3) IP address or designate a priority on the basis additional information of the candidate IP list (for example, of at least one of the current location of the user at the MEC host location, a user speed, or the MEC host performance (for example, Round Trip Time (RTT) and throughput)). According to an embodiment, when the access IP selected in the candidate IP list, one of the MEC host IP or the remote server IP may be selected. For example, when all MEC host locations are spaced apart from the user location by a predetermined distance or longer, an RTT value is larger than or equal to a predetermined value, or a user movement speed is faster than or equal to a predetermined value, the remote server IP may be selected without selection of the MEC host IP. According to an embodiment, the MSE 330 (for example, MEL 331) may select an optimal MEC host through pre-performance measurement (or test) (for example, ping probing or bandwidth estimation) for a plurality of candidate MEC hosts. According to an embodiment, the DNS server 1020 may record location information of the corresponding MEC host together with the IP address of the MEC host in a DNS response message. For example, w % ben the location information of the MEC host for a location record type (for example, LOC record type) among DNS types is included in the DNS response message received after the DNS query in the DNS resolving, the MSET 330 may select an adjacent MEC host on the basis of the corresponding location information. According to an embodiment, the MSE 330 may acquire location information of the MEC host (for example, latitude, longitude, serving cell ID, urban information, or ID) from the DNS server 1020 in the DNS query operation of acquiring the IP address of the MEC host. For example, the location information of the MEC host may be included in the DNS type field.

In operation 1530, the MSE 330 may perform DNS caching in the DNS cache 1010. According to an embodiment, when receiving a DNS response including address information from the DNS server 1020 in response to the DNS query, the MSE 330 may store address information (for example, an IP address corresponding to the URI (FQDN) related to the MEC host) included in the DNS response in a local DNS cache for MEC (for example, DNS Cache 2). According to an embodiment, when the client application 310 makes a request for address information (for example, URI or IP address) for the MEC application, the MSE 330 may transmit address information stored in the local DNS cache for MEC. According to various embodiments, in connection with management of the local DNS cache for MEC (for example, DNS Cache 2), a method including a method of managing a local DNS cache (DNS Cache 2) for MEC in FIG. 16 or a local DNS cache for MEC (for example, DNS Cache 2) for MEC within the MSE 330 in FIG. 17 may be used. The operation of managing the local DNS cache for MEC according to an embodiment is described in detail with reference to the following drawings.

According to various embodiments, the electronic device 101 may receive a plurality of pieces of MEC host information (for example, URIs or IP addresses) in which the MEC application can be executed in a communication procedure (for example, discovery/application context creation) with the MMP server 370 on the basis of the MEC host selection operation. According to an embodiment, the electronic device 101 may select one MEC host from among the plurality of received MEC hosts and communicate therewith. According to various embodiments, the electronic device 101 may select the plurality of MEC host in which the MEC application can be executed according to the priority. According to an embodiment, the priority may be determined on the basis of at least latency measurement information between the electronic device 101 and the MEC host or location information of the MEC host.

Hereinafter, an operation in which the electronic device 101 maintains and/or manages DNS caching data for MEC client applications (MEC client Apps) separately from DNS caching data for general client applications (generate client Apps) according to various embodiments.

Figure 16:
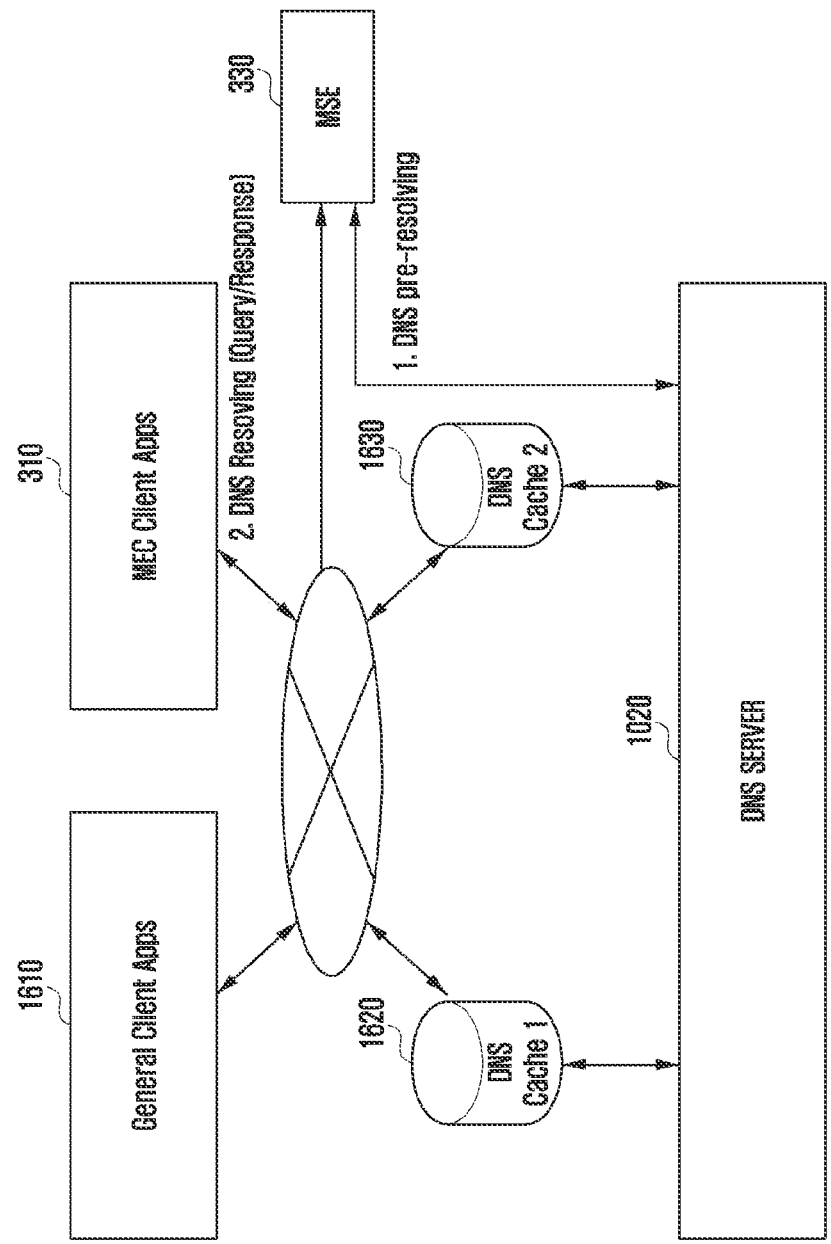
FIG. 16 illustrates an example in which the electronic device 101 separately manages a local DNS cache for MEC according to various embodiments.

FIG. 16 illustrates an example in which the electronic device 101 separately manages a local DNS cache for MEC according to various embodiments.

Referring to FIG. 16, FIG. 16 illustrates an example of configuring a local DNS cache for MEC separately from the MSE 330 of the electronic device 101. According to an embodiment, a general client application (general client Apps) 1610 may perform DNS caching in a first DNS cache 1620, and the MEC client application (MEC Client Apps) 310 may perform DNS caching in a second DNS cache 1630. For example, the general client application 1610 may use the first DNS cache 1620, and the MEC client application 310 may use the second DNS cache 1630.

According to an embodiment, only a request for a URI to be accessed by the client application may be made using a DNS resolving API and an IP address thereof may be received. For example, the MSE 330 (for example, DHL 335) (or the OS of the electronic device 101 or a DNS processing module on the framework) may change the corresponding request of the client application to a DNS query (for example, FQDN), transmit the DNS query to the DNS server 1020, receive a DNS response (for example, IP address corresponding to the FQDN), and cache and transmit the same to the client application. According to an embodiment, the MSE 330 may determine which DNS cache will be used for each client application or each URI (FQDN), and accordingly the DNS processing module (for example, in FIG. 16) or the DHL (in FIG. 17) of the MSE may transmit an IP address to the client application with reference to the first DNS cache 1620 or the second DNS cache 1630. According to an embodiment, when there is an IP corresponding to the corresponding URI with reference to the DNS cache for the requested URI (FQDN) the DNS processing module or the DHL may transmit the IP and, when there is no URI in the cache, may transmit a DNS query to the DNS server 1020.

Figure 17:
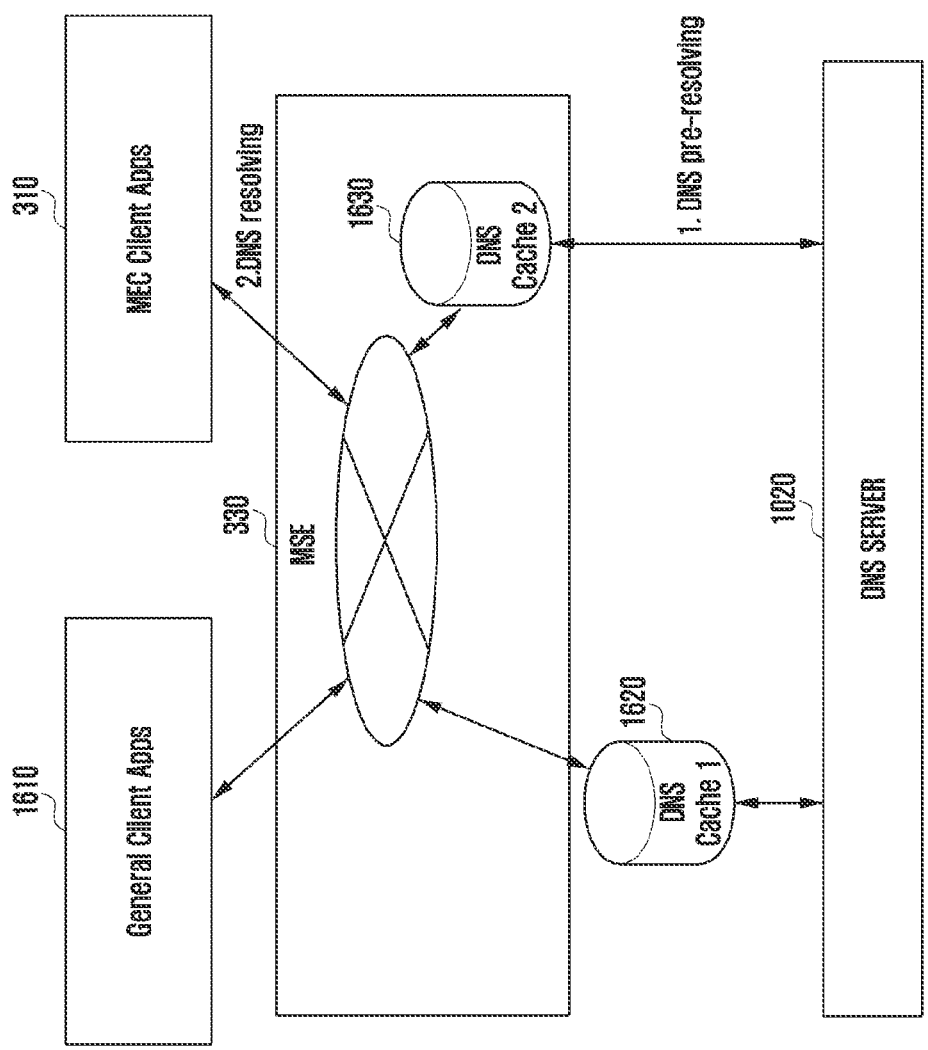
FIG. 17 illustrates an example in which the electronic device 101 manages a local DNS cache for MEC within the MSE 330 according to various embodiments of the disclosure.

FIG. 17 illustrates an example in which the electronic device 101 manages a local DNS cache for MEC within the MSE 330 according to various embodiments of the disclosure.

Referring to FIG. 17, FIG. 17 illustrates an example of configuring the local DNS cache (for example, second DNS cache 1630) for MEC in the MSE 330 of the electronic device 101. According to an embodiment, the general client application 1610 may perform DNS caching in the first DNS cache 1620, and the MEC client application 310 may perform DNS caching in the second DNS cache 1630. For example, the general client application 1610 may use the first DNS cache 1620, and the MEC client application 310 may use the second DNS cache 1630.

According to an embodiment, only a request for a URI to be accessed by the client application may be made using a DNS resolving API and an IP address thereof may be received. For example, the MSE 330 (for example, DHL 335) (or the OS of the electronic device 101 or a DNS processing module on the framework) may change the corresponding request of the client application to a DNS query (for example, FQDN), transmit the DNS query to the DNS server 1020, receive a DNS response (for example, IP address corresponding to the FQDN), and cache and transmit the same to the client application. According to an embodiment, the MSE 330 may determine which DNS cache will be used for each client application or each URI (FQDN), and accordingly the DNS processing module (for example, in FIG. 16) or the DHL (in FIG. 17) of the MSE may transmit an IP address to the client application with reference to the first DNS cache 1620 or the second DNS cache 1630. According to an embodiment, when there is an IP corresponding to the corresponding URI with reference to the DNS cache for the requested URI (FQDN) the DNS processing module or the DHL may transmit the IP and, when there is no URI in the cache, may transmit a DNS query to the DNS server 1020.

According to various embodiments, the performance of DNS caching separately between the general client application 1610 and the MEC client application 310 is described in detail with reference to the following drawing (for example, FIG. 36).

Figure 18:
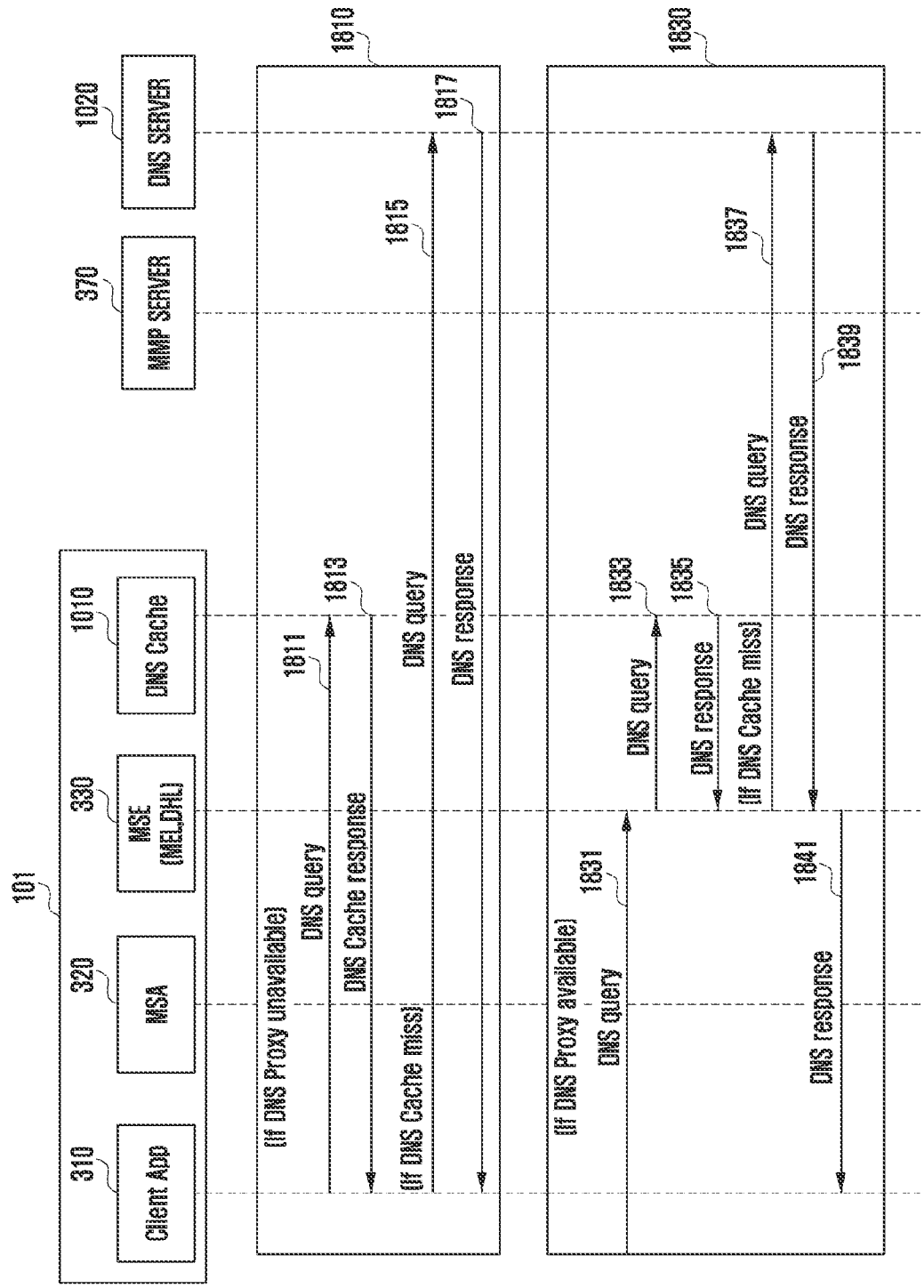
FIG. 18 is a diagram illustrating an example of a DNS resolving operation in the discovery procedure according to various embodiments of the disclosure.

FIG. 18 illustrates an example of a DNS resolving operation in the discovery procedure according to various embodiments of the disclosure.

As illustrated in FIG. 18, FIG. 18 illustrates a DNS resolving operation for a DNS query of the client application 310. According to an embodiment, the DNS resolving operation may include an operation (for example, operation 1810) in which the DNS server 1020 is in a deactivated state (for example, operation 1810) and an operation (for example, operation 1830) in which the DNS server 1020 is in an activated state.

According to an embodiment, the DNS resolving operation in operation 1810 may indicate, for example, an example of an operation in which a local DNS cache for MEC (for example, the second DNS cache 1630) is in the deactivated state in the DNS cache 1010. Referring to FIG. 18, the client application 310 may transmit a DNS query for a URI to the DNS cache 1010 (in operation 1811), and the DNS cache 1010 may transmit a response (for example, DNS Cache Response) to the DNS query of the client application 310 to the client application 310 (in operation 1813). According to an embodiment, the DNS cache 1010 may store at least one of an application name of the MEC application, a domain name, or an IP address for the domain name. According to an embodiment, when there is no IP address of the MEC application of the corresponding URI in the DNS cache 1010 (for example, DNS cache miss) during the DNS query for the URI of the client application 310, the client application 310 may transmit the DNS query to the DNS server 1020 (in operation 1815) and acquire the IP address from the DNS server 1020 on the basis of a response 1817 corresponding to the DNS query.

According to an embodiment, the DNS resolving operation in operation 1830 may indicate an example of an operation in which the local DNS cache for MEC (for example, second DNS cache 1630) is in the activated state in the DNS cache 1010. Referring to FIG. 18, the client application 310 may transmit the DNS query for the URI to the DNS cache 1010 through the MSE 330 (in operation 1831 and operation 1833). According to an embodiment, the DNS cache 1010 may transmit a DNS response to the DNS query to the MSE 330 (in operation 1835). According to an embodiment, when there is no IP address of the MEC application of the corresponding URI in the DNS cache 1010 (for example, DNS cache miss) during the DNS query for the URI of the client application 310, the MSE 330 may transmit the DNS query to the DNS server 1020 (in operation 1837), receive a response to the DNS query from the DNS server 1020 (in operation 1839), and forward the received response to the client application 310 (in operation 1841).

According to an embodiment, where there is an IP Address of the MEC application of the corresponding URI in the DNS cache 1010 during the DNS query for the URI of the client application 310, access to the MEC application may be performed through the corresponding address. According to an embodiment, in the case of DNS cache miss in DNS resolving, access to a remote server (for example, the remote server 309 of FIG. 3) or a Client App-driven MEC application may be performed through the DNS resolving. According to an embodiment, when there is a DNS proxy in DNS resolving, the DNS proxy may hook the DNS query of the client application and perform the DNS resolving according to the MEC app list.

According to an embodiment, the MSE 330 may support a DNS pre-resolving or DNS proxy function in a $3^{rd}$ party application. For example, when the client application 310 for MEC makes a DNS query for access to a specific service in the state in which data connection is made through the existing default PDU session, the DNS proxy may hook the DNS query and transfer the query to the DNS server through a domain name for MEC or look up in the DNS cache 1010 and return the corresponding MEC domain IP address. Accordingly, the $3^{rd}$ party application may provide the MEC service without any modification of separate software and without any separate traffic filtering (or steering) work of the operator.

Meanwhile, the above-described signal flowcharts may be combined with another signal flowchart and used as necessary. For example, after the authentication operation (for example, at least one of the authentication operations in FIGS. 4 to 6), the operation of FIG. 7 of performing NAS signaling may be performed.

Further, the above-described signal flowcharts may be replaced with some of other signal flowcharts and used. For example, the operations for the authentication in FIGS. 4 to 6 may be replaced with and implemented by an operation used in another drawing.

Various embodiments of the disclosure described and shown in the specification and the drawings are merely particular examples presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

INDUSTRIAL APPLICABILITY

The disclosure may be used to provide an edge computing service in a wireless communication system.

The invention claimed is:

1. A method performed by a user equipment (UE) in a wireless communication system, the method comprising:
    transmitting, to a server, a discovery request message to retrieve information associated with an application server, wherein the discovery request message includes location information of the UE and an application client profile; and
    as a response to the discovery request message, receiving, from the server, a discovery response message including the information associated with the application server based on the location information of the UE and the application client profile,
    wherein the information associated with the application server includes a list of the application server and uniform resource identifiers (URIs), and
    wherein the location information of the UE includes a cell identifier (ID) or a tracking area ID (TAI).

2. The method of claim 1, wherein the discovery request message further includes at least one of a discovery policy, or a service type.

3. The method of claim 1, wherein the information associated with the application server further includes a life time for the URIs.

4. The method of claim 1, wherein the discovery request message further includes at least one of a device type, a context type, or a dynamic data network name.

5. A method performed by a server in a wireless communication system, the method comprising:
    receiving, from a user equipment (UE), a discovery request message to retrieve information associated with an application server, wherein the discovery request message includes location information of the UE and an application client profile;
    retrieving the information associated with the application server, based on the location information of the UE and the application client profile; and
    as a response to the discovery request message, transmitting, to the UE, a discovery response message including the information associated with the application server,
    wherein the information associated with the application server includes a list of the application server and uniform resource identifiers (URIs), and
    wherein the location information of the UE includes a cell identifier (ID) or a tracking area ID (TAI).

6. The method of claim 5, wherein the discovery request message further includes at least one of a discovery policy, or a service type.

7. The method of claim 5, wherein the information associated with the application server further includes a life time for the URIs.

8. The method of claim 5, wherein the discovery request message further includes at least one of a device type, a context type, or a dynamic data network name.

9. A user equipment (UE) in a wireless communication system, the UE comprising:
    a transceiver, and
    a controller coupled with the transceiver configured to:
        transmit, to a server, a discovery request message to retrieve information associated with an application server, wherein the discovery request message includes location information of the UE and an application client profile; and
        as a response to the discovery request message, receive, from the server, a discovery response message including the information associated with the application server based on the location information of the UE and the application client profile,
    wherein the information associated with the application server includes a list of the application server and uniform resource identifiers (URIs), and
    wherein the location information of the UE includes a cell identifier (ID) or a tracking area ID (TAI).

10. The UE of claim 9,
    wherein the discovery request message further includes at least one of a discovery policy, or a service type.

11. The UE of claim 9,
wherein the information associated with the application server further includes a life time for the URIs.

12. The UE of claim 9,
wherein the discovery request message further includes at least one of a device type, a context type, or a dynamic data network name.

13. A server in a wireless communication system, the server comprising:
a transceiver, and
a controller coupled with the transceiver configured to:
   receive, from a user equipment (UE), a discovery request message to retrieve information associated with an application server, wherein the discovery request message includes location information of the UE and an application client profile;
   retrieve the information associated with the application server based on the location information of the UE and the application client profile; and
   as a response to the discovery request message, transmit, to the UE, a discovery response message including the information associated with the application server,
wherein the information associated with the application server includes a list of the application server and uniform resource identifiers (URIs), and
wherein the location information of the UE includes a cell identifier (ID) or a tracking area ID (TAI).

14. The server of claim 13, wherein the discovery request message further includes at least one of a discovery policy, or a service type.

15. The server of claim 13, wherein the information associated with the application server further includes a life time for the URIs of the application.

16. The server of claim 13, wherein the discovery request message further includes at least one of a device type, a context type, or a dynamic data network name.

\* \* \* \* \*